United States Patent
Coppola et al.

(10) Patent No.: US 8,769,047 B1
(45) Date of Patent: Jul. 1, 2014

(54) DELIVERY CONTROL FOR COOPERATIVE DELIVERY SYSTEMS

(71) Applicant: Limelight Networks, Inc., Tempe, AZ (US)

(72) Inventors: Peter Coppola, San Diego, CA (US); John Scharber, Placerville, CA (US); Jason Wolfe, Gilbert, AZ (US); Joseph DePalo, Peoria, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

(21) Appl. No.: 14/109,340

(22) Filed: Dec. 17, 2013

(51) Int. Cl.
*G06F 15/16* (2006.01)
*H04L 12/24* (2006.01)
*H04L 29/08* (2006.01)
*G06F 17/30* (2006.01)

(52) U.S. Cl.
CPC .......... *H04L 41/509* (2013.01); *H04L 67/2842* (2013.01); *G06F 17/30902* (2013.01)
USPC .......................................... 709/218; 709/238

(58) Field of Classification Search
CPC ............ H04L 67/2814; H04L 67/2842; H04L 41/509; G06F 17/30902
USPC ................................. 709/218, 238
See application file for complete search history.

(56) References Cited

U.S. PATENT DOCUMENTS

| | | | |
|---|---|---|---|
| 7,200,681 B1 * | 4/2007 | Lewin et al. ................... | 709/246 |
| 7,552,338 B1 * | 6/2009 | Swildens et al. .............. | 713/176 |
| 8,214,450 B2 * | 7/2012 | Raciborski et al. ........... | 709/217 |
| 2007/0067424 A1 * | 3/2007 | Raciborski et al. ........... | 709/223 |

OTHER PUBLICATIONS

"OnApp CDN is a unique federated CDN platform for service providers—one that pays you". Retrieved from http://onapp.com/platform/onapp-cdn, 2 pages, 2012.
Pathan et al. "A Taxonomy and Survey of Content Delivery Networks". Grid Computing and Distributed Systems Laboratory Department of Computer Science and Software Engineering at the University of Melbourne, Feb. 2007, 44 pages.
Puopolo et al. "Content Delivery Network (CDN) Federations: How SPs Can Win the Battle for Content-Hungry Consumers", Cisco IBSG, Oct. 2011, 9 pages.
Sun et al. "Identifying Performance Bottlenecks in CDNs through TCP-Level Monitoring". Department of Computer Science, Princeton University, Aug. 2011, 6 pages.
"What Every Service Provider Should Know About Federated CDNs". Retrieved from http://www.skytide.com/products/federated-cdns, 11 pages, 2011.

* cited by examiner

*Primary Examiner* — David Lazaro
(74) *Attorney, Agent, or Firm* — Kilpatrick Townsend & Stockton LLP

(57) ABSTRACT

Systems and methods for content delivery control in a cooperative delivery system are disclosed. A rules repository stores control parameters. A content delivery network is configured to receive a request for a content object from an end-user system; receive from the rules repository a control parameter where the control parameter provides information about delivery and/or caching the content object; insert a string into a uniform resource identifier (URI) or response header for the content object; and transmit the response to or through a terminal network. The terminal network receives the response; identifies the string; identifies the control parameter; and processes delivery or storage of the content object based on the control parameter.

20 Claims, 16 Drawing Sheets

DELIVERY CONTROL FOR COOPERATIVE DELIVERY SYSTEMS

BACKGROUND

This disclosure relates in general to content delivery over the Internet and, but not by way of limitation, to content delivery networks amongst other things.

Content delivery networks (CDNs) have a geographically distributed network of points of presence (POPs) such that one is likely to be close to an end user. A request for content is matched to a nearby POP using routing, domain name service (DNS) diversion, redirection, Anycast and/or other techniques. An edge server in the POP generally serves the content from a cache of the edge server, a host within the CDN, or an origin server depending on where the content is located. For content that is missing from the CDN, the request to the origin server can be costly in terms of quality of service.

BRIEF SUMMARY

In some embodiments, the present disclosure provides systems and methods for controlling delivery of a content object over the Internet using a cooperative delivery system. A rules repository stores a plurality of control parameters. A content delivery network is configured to receive a request for a content object from an end-user system; receive from the rules repository a control parameter, where the control parameter provides information about delivery and/or caching the content object; insert a string into a uniform resource identifier (URI) or response header for the content object; and transmit the response to or through a terminal network. The terminal network receives the response; identifies the string; identifies the control parameter; and processes delivery or storage of the content object based on the control parameter. In some embodiments, the terminal network removes the string from the response before sending the response to the end user. In some embodiments, the terminal network purges a content object from a cache based on a control parameter. In some embodiments, control parameters are passed out of band between networks.

In some embodiments, systems and methods for delivering a content object from a cache in a terminal network are disclosed. An edge server in a content delivery network provides a duration for a terminal network to cache a content object. The duration, in some embodiments, is conveyed by a control parameter. The content delivery network has a contract with a content provider to deliver the content object to end users. The terminal network receives a request from an end-user system for the content object. Based on the request being received within the duration, the terminal network delivers the content object to the end-user system. The terminal network then reports delivery of the content object to the content delivery network and/or to an intermediary. The terminal network is then compensated for delivering the content object.

In further embodiments, systems and methods for delivering content objects over the Internet to end-user systems using a cooperative delivery system are disclosed. An edge server in a content delivery network receives a first request. The first request is from an end-user system for a first content object. A network interface receives a second request, wherein the second request is from a second network to deliver a second content object. The network interface and an assignment engine are part of the content delivery network. The assignment engine assigns the content delivery network to deliver the first content object. The assignment engine assigns a third network to deliver the second content object.

In yet additional embodiments, systems and methods for dynamically allocating network resources to improve experiences of users accessing content over the Internet are disclosed. An end-user system requests content over the Internet. A content delivery network and a terminal network form a cooperative delivery system. An edge server, which is part of the content delivery network, delivers the content to the end-user system and determines that an experience of an end user accessing the content over the Internet is likely being limited by latency and/or bandwidth in the cooperative delivery system. The end user is provided an option to select an upgraded service. After the end user selects the upgraded service, the end-user system is provided a higher bandwidth and/or lower latency connection while the content is being delivered.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
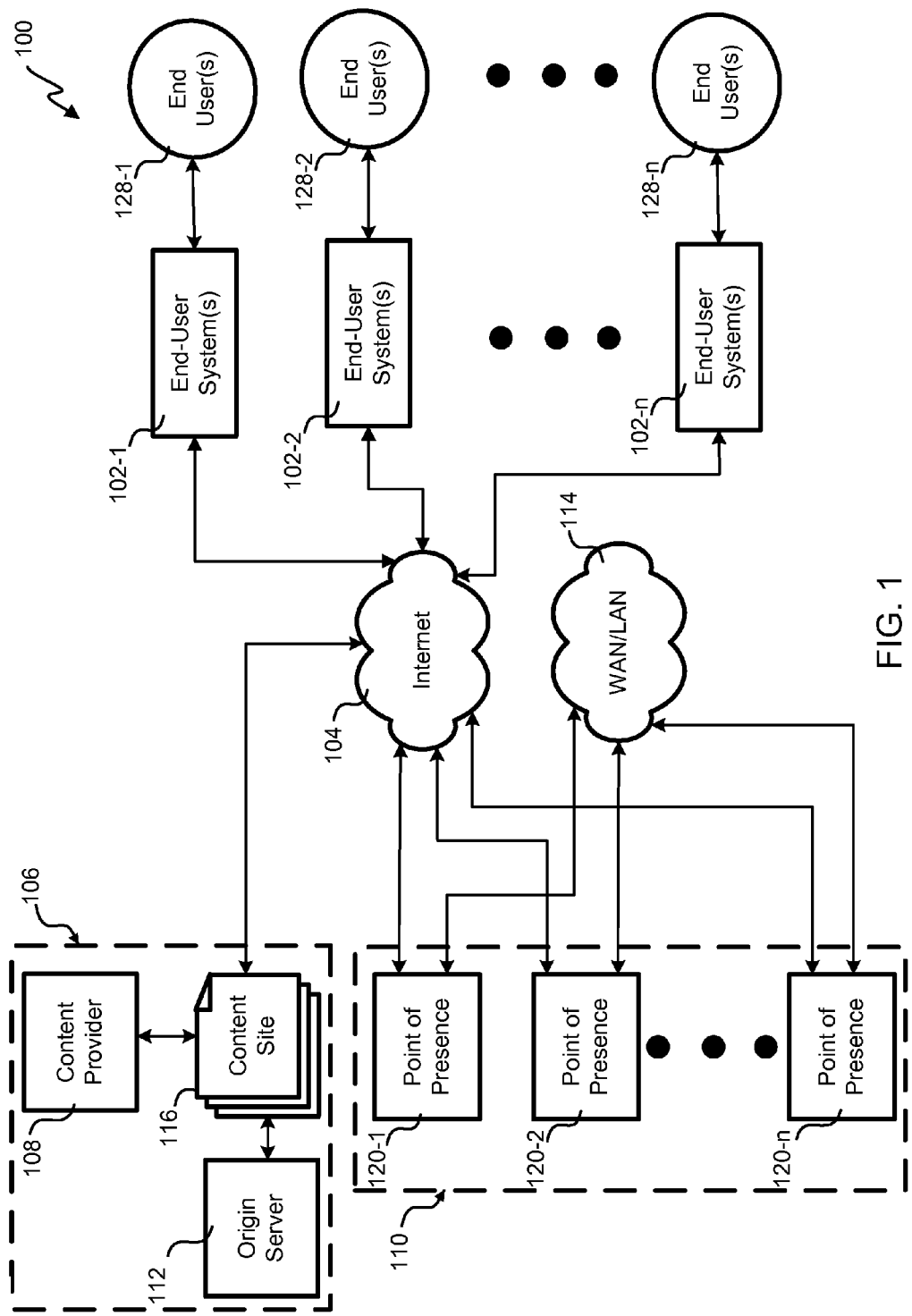
FIG. 1 depicts a block diagram of an embodiment of a content distribution system.

Referring first to FIG. 1, a block diagram of an embodiment of a content distribution system 100 is shown. The content originator 106 offloads delivery of the content objects to a content delivery network (CDN) 110. The content originator 106 produces and/or distributes content objects and includes a content provider 108, a content site 116, and an origin server 112. The CDN 110 can both cache and/or host content in various embodiments for third parties to offload delivery and typically provide better quality of service (QoS) to a broad spectrum of end-user systems 102 distributed geographically. The content originator 106 is the customer of the CDN 110 and an end user 128 benefits from improvements in QoS.

In this embodiment, the content distribution system 100 locates the content objects (or portions thereof) and distributes the content objects to an end-user system 102. The content objects are dynamically cached within the CDN 110 and/or hosted by the CDN 110. A content object is any content file, content stream, or a range defining a segment of a content file or content stream, and could include, for example, video, pictures, data, audio, software, and/or text. The content object could be live, delayed, or stored. The range defining a segment could be defined as a byte range or time range within the playback. Throughout the specification, references may be made to a content object, content, content stream and/or content file, but it is to be understood that those terms could be used interchangeably wherever they may appear.

Many content providers 108 use a CDN 110 (or multiple CDNs) to deliver the content objects over the Internet 104 to end users 128. The CDN 110 includes a number of points of presence (POPs) 120, which are geographically distributed through the content distribution system 100 to deliver content. Various embodiments may have any number of POPs 120 within the CDN 110 that are generally distributed in various locations around the Internet 104 so as to be proximate to end-user systems 102. Multiple POPs 120 use the same IP address such that an Anycast routing scheme is used to find a POP likely to be close to the end-user system 102, in a network sense, for each request. In addition to the Internet 104, a wide area network (WAN) and/or local area network (LAN) 114 or other backbone may couple the POPs 120 with each other and also couple the POPs 120 with other parts of the CDN 110. Distributed storage, processing, and caching is provided by the CDN 110.

When an end user 128 requests a web page (or other content) through its respective end-user system 102, the request for the web page is passed either directly or indirectly via the Internet 104 to the content originator 106. The content originator 106 is the source or re-distributor of content objects, i.e., the so-called origin server 112. The content site 116 is an Internet web site accessible by the end-user system 102. In one embodiment, the content site 116 could be a web site where the content is viewable with a web browser. In other embodiments, the content site 116 could be accessible with application software other than a web browser. The content provider 108 directs content requests to a CDN 110 after they are made or formulates the delivery path by embedding the delivery path into a uniform resource identifier (URI) for a web page. In any event, the request for content is handed over to the CDN 110 in this embodiment by using an Anycast IP address corresponding to two or more POPs 120. In some embodiments, the CDN 110 hosts content objects and/or web pages, thus acting as the origin server 112.

Once the request for a content object is passed to the CDN 110, the request is associated with a particular POP 120 within the CDN 110 using the Anycast routing scheme, but other embodiments could use routing, redirection, or DNS to shunt requests to a particular POP 120. It is noted that the CDN 110 processes requests for content in the application layer of the open systems interconnection (OSI) model with URIs, URLs, and HTTP. The particular POP 120 may retrieve the portion of the content object from the content provider 108, where the content originator 106 is hosting the origin server 112. Alternatively, the content provider 108 may directly provide the content object to the CDN 110 and POPs 120 associated with the CDN 110 through pre-population of caches (i.e., in advance of the first request) or hosting. A storage policy could be defined to specify the conditions under which pre-population is performed. In this embodiment, content objects are provided to the CDN 110 and stored in one or more CDN servers such that the portion of the requested content may be hosted from the CDN 110. The CDN servers include edge servers in each POP 120 that serve end-user requests. The origin server 112 holds a copy of each content object for the content originator 106. Periodically, the content of the origin server 112 may be reconciled with the CDN 110 through a caching, hosting, and/or pre-population algorithm, for example, through a storage policy. Some content providers 108 could use an origin server 112 within the CDN 110 to host the content and avoid the need to maintain a copy.

Once the content object is retrieved, the content object is stored within the particular POP 120 and is served from that POP to the end-user system 102. The end-user system 102 receives the content object and processes the content object for use by the end user 128. The end-user system 102 could be a personal computer, media player, handheld computer, tablet, pad, Internet appliance, phone, smart phone, IPTV set top, streaming radio, or any other device that receives and plays content objects. In some embodiments, a number of the end-user systems 102 could be networked together. Although this embodiment shows only a single content originator 106 and a single CDN 110, it is to be understood that there could be many of each in various embodiments.

Figure 2:
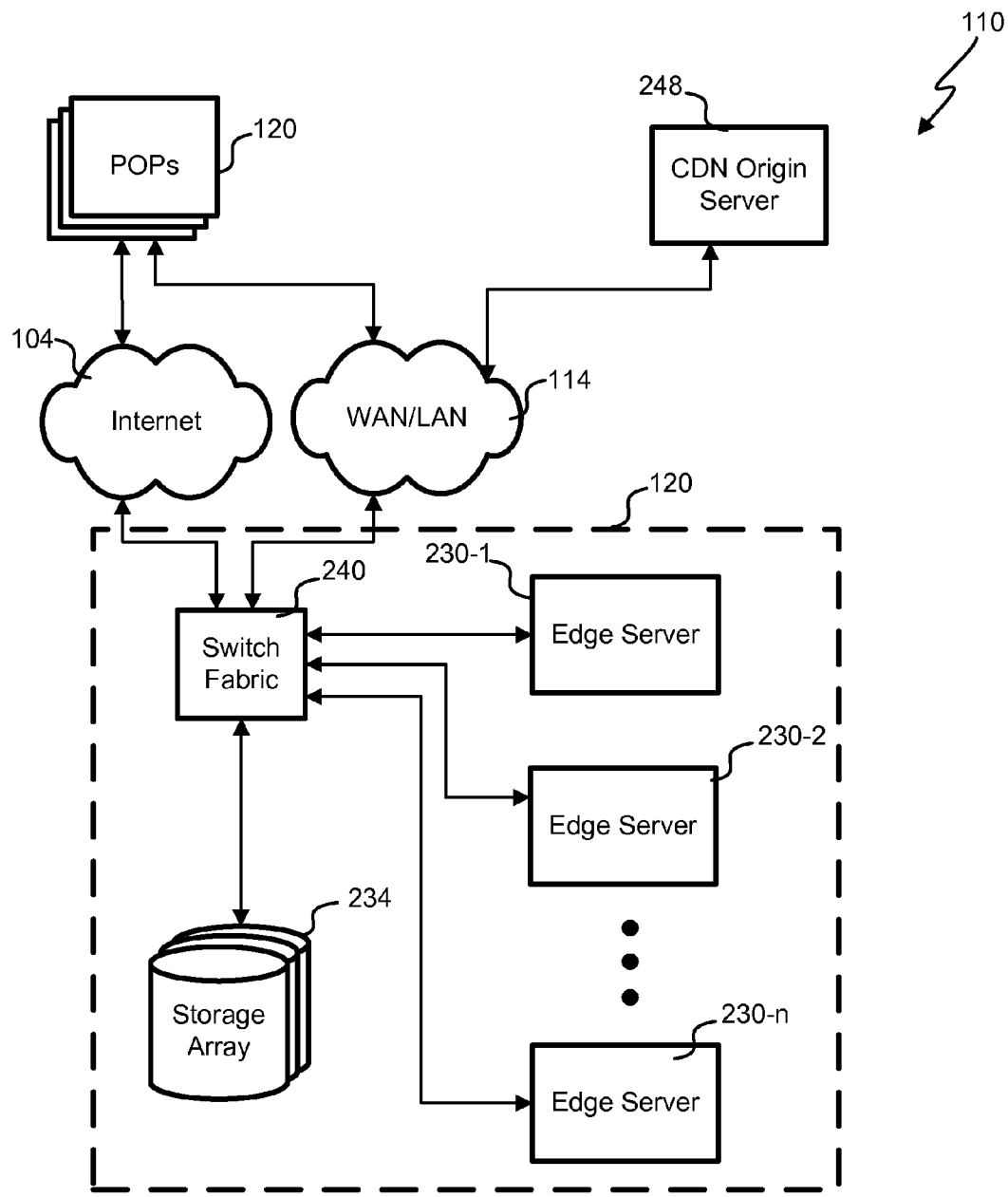
FIG. 2 depicts a block diagram of an embodiment of a content delivery network (CDN)

With reference to FIG. 2, a block diagram of an embodiment of a CDN 110 is shown. Although only one POP 120 is shown in detail, there are a number of POPs 120 similarly configured throughout the CDN 110. The POPs 120 communicate through a WAN/LAN 114 and/or the Internet 104 when locating content objects. An interface from the Internet 104 to the POP 120 accepts requests for content objects from end-user systems 102. The requests come from an Internet protocol (IP) address of the end-user system 102 in the form of a URI that causes an HTTP get command. The requests for content files from the CDN 110 pass through the application layer.

Switch fabric 240 assigns the request to one of the edge servers 230 according to a routing scheme such as round robin, load balancing, etc. In some embodiments, the switch fabric 240 is aware of which edge servers 230 have what capabilities and assigns requests within the group having the capability to store and serve the particular content object referenced in the URI. Edge servers 230 gathered in a particular group as neighbors can be grouped with other servers in the current POP 120, less loaded servers in the current POP 120, servers having a capability to process the content object, a subset of servers assigned to a customer using the CDN 110 to serve the content object, or some other grouping of servers in the POP 120.

In some cases, the CDN 110 is used to host content for others. Content providers 108 upload content to a CDN origin server 248. Although only one CDN origin server 248 is shown, it is to be understood that there could be many spread among a number of locations and/or POPs 120. The content object can be stored in the CDN origin server 248. The CDN origin server 248 serves the content object within the CDN 110 to various edge servers 230 in various POPs 120. After the content provider 108 places a content object on the CDN origin server 248 the content object need not be hosted on an origin server 112 of the content originator 106 redundantly. Although shown separately, it is to be understood that the CDN origin sever 248 could be integral to an edge server 230.

Some embodiments include an optional storage array 234 in the POP 120 or elsewhere in the CDN 110. The storage array 234 can provide hosting, storage, and/or caching. Edge servers 230 can revert to the storage array 234 for certain content, for example, very large files or infrequently requested files. Flushing of a cache of an edge server 230 could move the content to the storage array 234 until it is ultimately flushed from the storage array 234 after which subsequent requests would be fulfilled by an origin server 112 to repopulate cache in the POP 120.

Requests from end-user systems 102 are assigned to an edge server 230 that may cache, store, or host the requested content object. At times, the edge server 230 receiving a request does not have the content object stored for immediate serving. This so-called "cache miss" triggers a process within the CDN 110 to find the content object (or portion thereof). The content may be found in neighboring edge servers 230 in the same POP 120, in another POP 120, in a CDN origin server 248, in a POP storage array 234, or even an origin server 112 external to the CDN 110. The various edge servers 230 and CDN origin servers 248 are grouped for various URIs uniquely. In other words, one URI may look to one group of servers 230, 248 on a cache miss while another URI will look to a different group of servers 230, 248.

Figure 3:
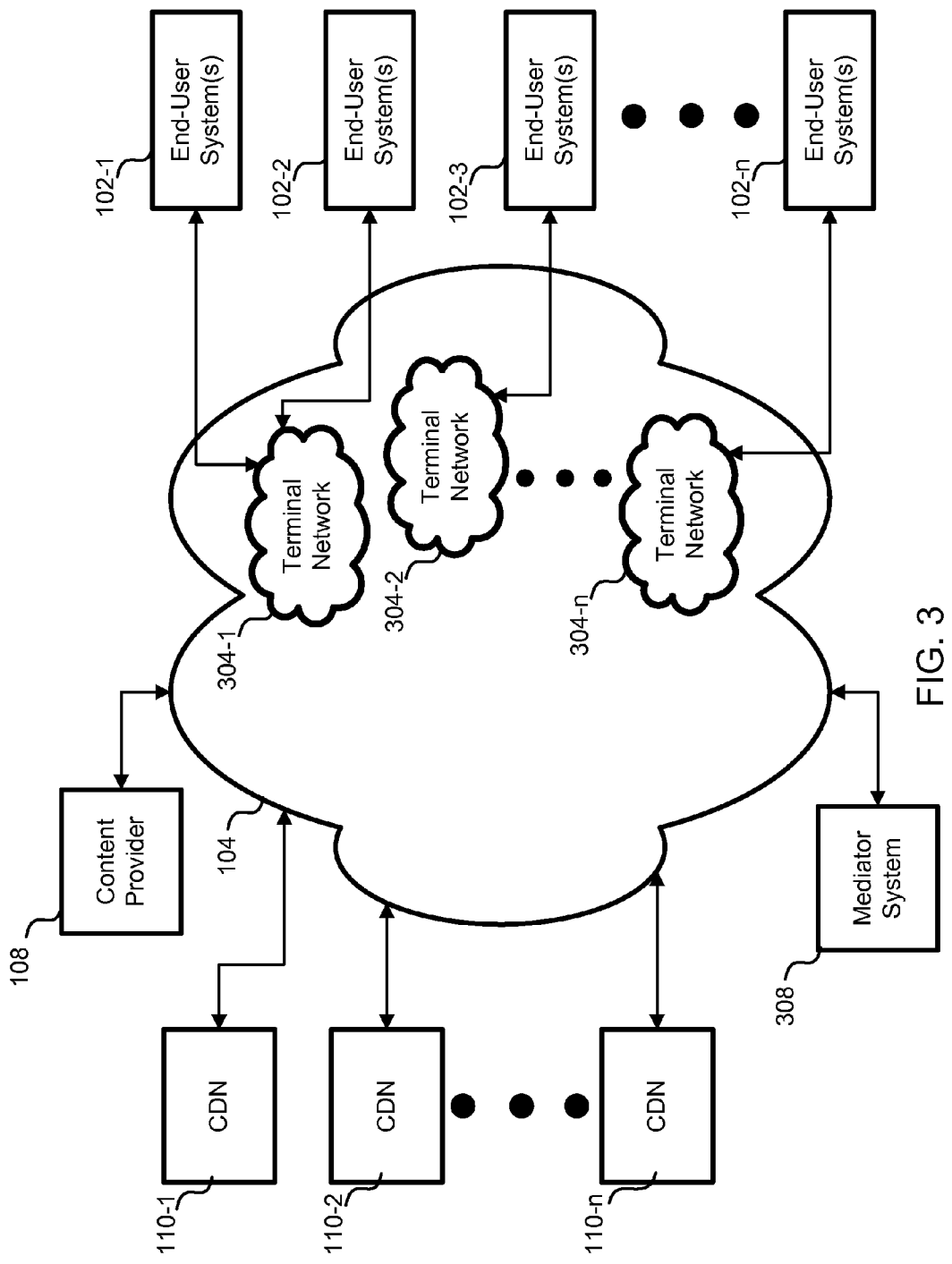
FIG. 3 depicts a block diagram of an embodiment of a cooperative delivery system.

Referring next to FIG. 3, an embodiment of a cooperative delivery system is shown. A content provider 108 is connected to the Internet 104. Also connected to the Internet 104 are a plurality of CDNs 110 and a plurality of end-user systems 102. As part of the Internet 104, a plurality of terminal networks 304 provide internet service to the plurality of end-user systems 102. In some embodiments, terminal networks 304 are "last mile" networks providing telecommunications, cable television, and/or Internet services to end users 128. Some examples of terminal networks 304 include CenturyLink, Comcast, Verizon, and AT&T. In some embodiments, terminal networks 304 include peer networks. In some embodiments, terminal networks 304 have caches to store content objects. Caches of the terminal networks 304 can be a single cache, or spread out among a plurality of caches similar to a CDN 110 with a plurality of POPs 120. Some terminal networks 304 function as a content delivery network 110.

In this embodiment, the content provider 108 contracts with a first CDN 110-1 for delivery of a content object to end-user systems 102. Though only one content provider 108 is shown, there may be many content providers 108 contracting with CDNs 110 and/or terminal networks 304 for delivery of a plurality of content objects. Also, an origin server 112 having the content object can be external to the CDN 110 or internal to the CDN 110, such as in a CDN origin server 248. In some embodiments, the first CDN 110-1 subcontracts delivery of the content object to a second CDN 110-2 and/or terminal network 304 for delivery to an end-user system 102. The first CDN 110-1 may subcontract delivery of the content object for various reasons. For example, the second CDN 110-2 may have a better coverage of POPs 120 in a given geographic area. The first CDN 110-1 may have several POPs 120 in North America and Europe, but not South America. The second CDN 110-2 may have several POPs 120 in South America. To deliver the content object to an end user 128 in South America, the first CDN 110-1 subcontracts delivery of the content object to the second CDN 110-2. In another example, the second CDN 110-2 also has POPs 120 in Europe. When POPs 120 of the first CDN 110-1 in Europe become overloaded, the first CDN 110-1 has the second CDN 110-2 deliver the content object in Europe.

In some embodiments, the first CDN 110-1 subcontracts delivery of the content object with terminal networks 304. For example, the first terminal network 304-1 caches the content object when delivering the content object to a first end-user system 102-1. When a second end-user system 102-2 requests the content object, the first terminal network 304-1 serves the content object from a cache of the first terminal network 304-1.

In some embodiments, a mediator system 308 is also connected to the Internet 104. The mediator system 308 serves several functions for the cooperative delivery system, such as assignment, accounting, and control. In some embodiments, the mediator system 308 receives requests for delivery of the content object and assigns a CDN 110 or a terminal network 304 to deliver the content object. The mediator system 308 chooses a CDN 110 or terminal network 304 based on geography, latency in a network, delivery cost, quality of service, etc. In some embodiments, the mediator system 308 contracts with the content provider 108 for delivery of the content object instead of the first CDN 110-1 contracting with the content provider 108 for delivery of the content object. In some embodiments, the mediator system 308 is part of, and/or controlled by, a CDN 110 or terminal network 304. Also, a cooperative delivery system may comprise two or more mediator systems 308, and each mediator systems 308 is tied to a particular CDN 110.

In some embodiments, the mediator system 308 accounts for content delivery. After assigning delivery of the content object to a CDN 110 or terminal network 304, the mediator system 308 credits that network with delivery of the content object. In other embodiments, the mediator system 308 receives reports about delivery of the content object before crediting the CDN 110 or terminal network 304 for delivery.

In some embodiments, the mediator system 308 also establishes control parameters for delivery of the content object. For example, the content provider 108 sets a minimum quality of service threshold for delivering the content object. When assigning delivery of the content object, the mediator system 308 passes variables specifying the control parameters to the CDN 110 and/or terminal network 304 delivering the content object.

Control parameters, and/or information indicative of control parameters, are passed between entities in a cooperative network in various ways. Control parameters can be sent in a request, such as in a header or by modifying a URI of the request. For example, a first terminal network 304-1 sends an initial request for a content object to a first CDN 110-1. Headers of the initial request identify the first terminal network 304-1 and/or capabilities of the first terminal network 304-1 (i.e., control parameters). The first CDN 110-1 receives the initial request and analyzes the control parameters in the headers of the initial request. The first CDN 110-1 modifies headers in a response to the initial request. The headers in the response identify control parameters. In this example, the control parameters include a customer account ID and desired capabilities for the first terminal network 304-1 to use in delivering the content object.

Control parameters can also be passed independent of a request. Passing information independent of a request is referred to as "out-of-band" communication. In one example of out-of-band communication used in passing control parameters is the first CDN 110-1 publishing information, such as a list of network blocks and/or an advance shipping notifications (ASNs) to the terminal networks 304. The first terminal network 304-1, in some embodiments, uses the published information to form headers in the initial request in the example in the paragraph above.

In another example of passing control parameters out of band, the first CDN 110-1 requests one or more terminal networks 304 to reserve a bandwidth capacity and/or disk space. For example, the first CDN 110-1 requests the second terminal network 304-2, using a control parameter sent out of band, to reserve 10% of the second terminal network's 304-2 bandwidth for a period of time to support a rollout of an operating-system update for a content originator. The first CDN 110-1 could also use a control parameter sent out of band to request pre-positioning of the operating-system update using a footprint of the second terminal network 304-2.

In another example of an out-of-band communication, the mediator system 308 receives instructions from the content provider 108 to purge the content object from caches within the cooperative delivery system. The mediator system 308 then sends a notification (i.e., an out-of-band notification) for the CDNs 110 and/or terminal networks 304 to purge the content object from caches of the CDNs 110 and/or terminal networks 304.

Figure 4A:
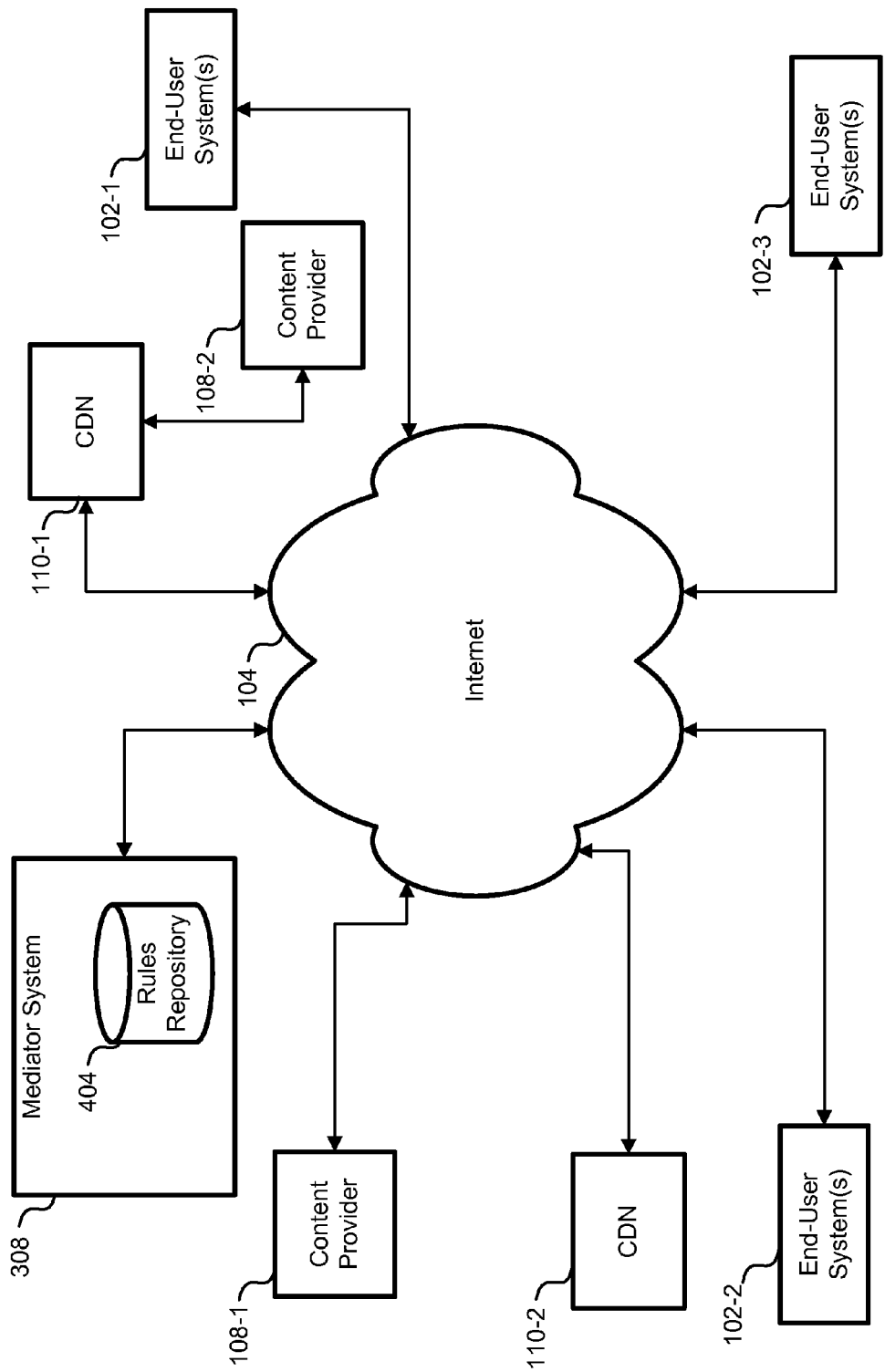
FIGS. 4A, 4B, and 4C depict block diagrams of further embodiments of cooperative delivery systems.
Figure 4B:
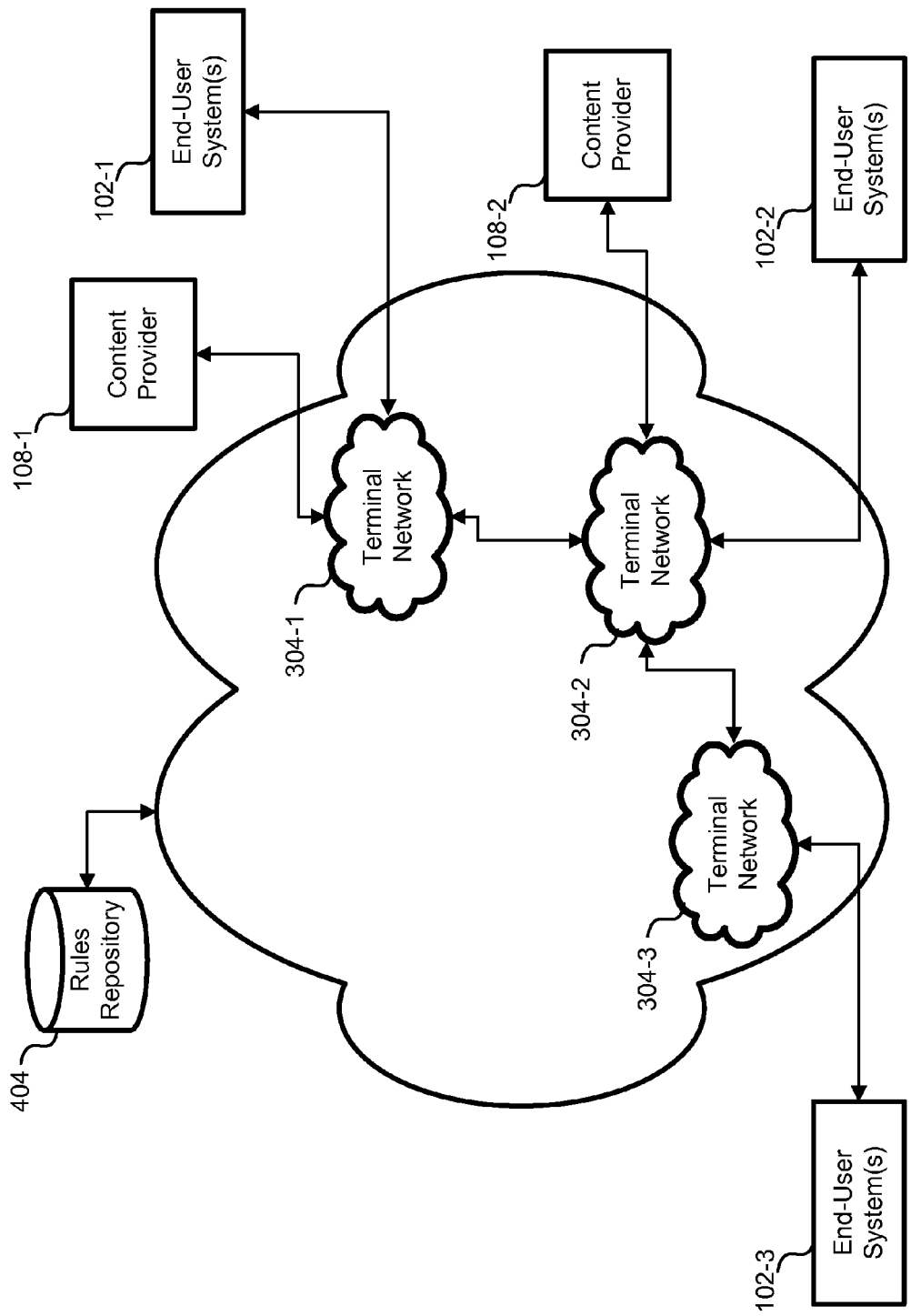
Figure 4C:
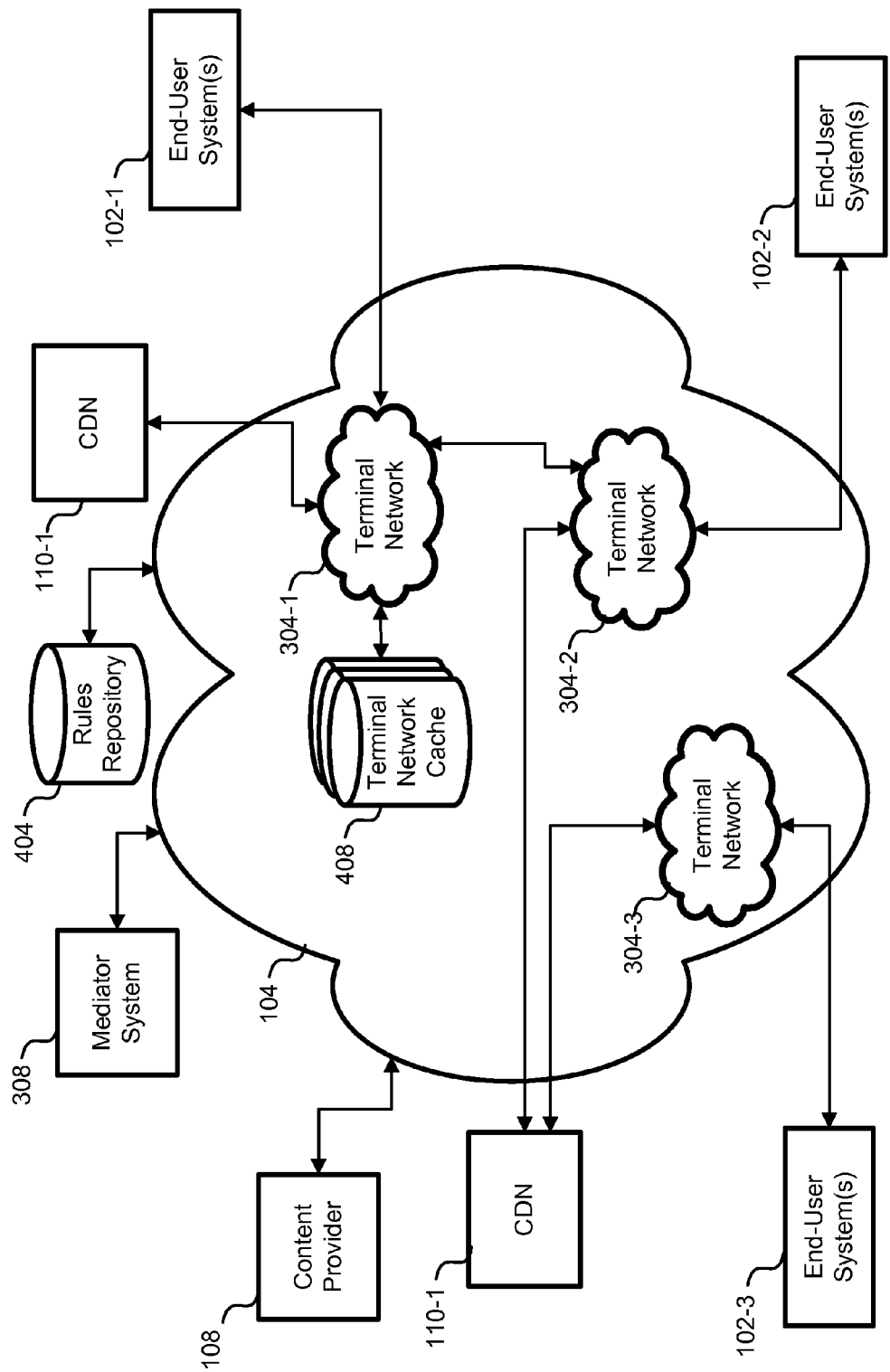

Referring next to FIGS. 4A, 4B, and 4C, block diagrams of embodiments of a cooperative delivery system are shown. FIG. 4A depicts a cooperative delivery system with a plurality of CDNs 110 and end-user systems 102 distributed geographically and connected to the Internet 104. Also shown is a first content provider 108-1 and a mediator system 308, both connected to the Internet 104. A second content provider 108-2 is connected to a first CDN 110-1. In some embodiments, the second content provider 108-2 is connected to the first CDN 110-1 through a WAN or Internet 104 connection. The mediator system 308 comprises a rules repository 404. In some embodiments, the rules repository 404 is not part of the mediator system 308, but part of one or more of the CDNs 110. In some embodiments, resources of a terminal network 304 are managed by command-and-control infrastructure of a CDN 110. For example, a CDN 110 instructs a resource in a terminal network 304 to spin up an application on a virtual machine. In another example, a CDN 110 manages caching of objects in a cache of a terminal network 304, such as by instructing how long the terminal network 304 to cache a content object. In some embodiments, a CDN 110 performs some or all functions of a mediator system 308, and the mediator system 308 is not used.

In this embodiment, the CDNs 110 and end-user systems 102 are distributed geographically. For example, the first CDN 110-1, a first end-user system 102-1, and the second content provider 108-2 are located in North America; a second CDN 110-2 and a second end-user system 102-2 are located in Europe; a third end-user system 102-3 is located in South America; and the first content provider 108-1 and the mediator system 308 are located in Asia. Thus the first CDN 110-1 is the nearest CDN 110 to the first end-user system 102-1, and the second CDN 110-2 is the nearest CDN 110 to the end-user system 102-2. In some embodiments, the closeness of a CDN 110 to an end-user system 102 is based on a network connectivity instead of geographical locations.

The first content provider 108-1 wishes to distribute content over the Internet 104 to the plurality of end-user systems 102. In some embodiments, the first content provider 108-1 contracts with the mediator system 308 to distribute content. In some embodiments, the content provider 108-1 specifies control parameters on how the content is to be delivered. The mediator system 308 receives control parameters, and stores control parameters in the rules repository 404. When an end-user system 102 makes a request for the content, the request is routed to the mediator system 308. The mediator system 308 selects a CDN 110 to deliver the content. The mediator system 308 selects the CDN 110 to deliver the content based, at least partially on, one or more of geographic location, control parameters, network location, cost, quality of service, latency, network capacity, capabilities of the CDN 110, or known caching of the content within the CDN 110. Capabilities of the CDN 110 include such things as use of split TCP and/or TCP fast open, the ability to transcode and/or encode content objects to certain formats, etc.

As an example, when the first end-user system 102-1 request the content, the mediator system 308 would select the first CDN 110-1 to deliver the content to the first end-user system 102-1 based on the first CDN 110-1 being the nearest CDN 110, in a geographic sense, to the first end-user system 102-1. When the second end-user system 102-2 requests the content, the mediator system 308 would select the second CDN 110-2 deliver the content to the second end-user system 102-2 based on the second CDN 110-2 being the nearest CDN 110-2 to the second end-user system 102-2. When the third end-user system 102-3 requests the content, the mediator system 308 can select any CDN 110, but will likely select either the first CDN 110-1 or the second CDN 110-2.

In another example, the second content provider 108-2 wishes to distribute a second content object over the Internet 104 to end-user systems 102. The second content provider 108-2 contracts with the first CDN 110-1 to deliver the second content object. When the second end-user system 102-2 requests the second content object, a request for the second content object is routed to the first CDN 110-1. In some embodiments, the first CDN 110-1 routes the request for the second content object to the mediator system 308, and the mediator system 308 selects a CDN 110, such as the second CDN 110-2, to deliver the second content object to the second end-user system 102-2. In some embodiments, the first CDN 110-1 does not route the request for the second content object to the mediator system 308. Instead, the first CDN 110-1 receives data from the mediator system 308 or the second CDN 110-2, either before or after the request for the second content object. The first CDN 110-1 determines whether or not to route the request for the second content object to another CDN 110 based on the data received from the mediator system 308 or the second CDN 110-2. In some embodiments, the first CDN 110-1 determines to route the request for the second content object to another CDN 110, such as the second CDN 110-2, based on the second CDN 110-2 having an ability to deliver the second content object according to terms that the first CDN 110-1 deems favorable (e.g., using business logic taking into account cost and quality of delivery). In some embodiments, the first CDN 110-1 selects the second CDN 110-2 from several CDNs 110 based on business logic (e.g., the second CDN 110-2 having the lowest delivery cost, the second CDN 110-2 having the highest delivery quality, or the second CDN 110-2 having the "best" combination of delivery cost and delivery quality). In some situations, the first CDN 110-1 may, instead, select the first CDN 110-1 to deliver the second content object to the second end-user system 102-2.

Referring next to FIG. 4B, a plurality of end-user systems 102 and a plurality of content originators 106 are distributed geographically and connected to a plurality of geographically distributed terminal networks 304. The terminal networks 304 are part of the Internet 104. A rules repository 404 is also connected to the Internet 104. In some embodiments there, are more than one rules repository 404. In this embodiment, a first terminal network 304-1 is connected to a second terminal network 304-2, and the second terminal network 304-2 is connected to a third terminal network 304-3. The first terminal network 304-1 is connected to a first content provider 108-1, and the second terminal network 304-2 is connected to a second content provider 108-2. Further, the first terminal network 304-1 is connected to a first end-user system 102-1; the second terminal network 304-2 is connected to a second end-user system 102-2; and the third terminal network 304-3 is connected to a third end-user system 102-3.

In some embodiments, the terminal networks 304 function similarly to the CDNs 110 in FIG. 4A. Terminal networks 304 working together could be considered a federated terminal network delivery system. The first terminal network 304-1 contracts with the first content provider 108-1 to deliver a first content object to end-user systems 102. The second terminal network 304-2 contracts with the second content provider 108-2 to deliver a second content object to end-user systems 102. In some embodiments, the first terminal network 304-1 and the second terminal network 304-2 create a peer relationship to deliver content objects for each other. For example, the second terminal network 304-2 delivers the first content object to the second end-user system 102-2 without cost to the first terminal network 304-1; and the first terminal network 304-1 delivers the second content object to the first end-user system 102-1 without cost to the second terminal network 304-2. In some embodiments, a mediator system 308, connected to the Internet 104, tracks delivery of content objects. In some embodiments, terminal networks 304 in a peer relationship do not use the mediator system 308.

Referring next to FIG. 4C, a block diagram of an embodiment of a cooperative delivery system is shown. A first end-user system 102-1 is connected to a first terminal network 304-1, such that the first end-user system 102-1 receives access to the Internet 104 from the first terminal network 304-1. A first CDN 110-1 is connected to the first end-user system 102-1 via the first terminal network 304-1. A second CDN 110-2 is connected to a second end-user system 102-2 via a second terminal network 304-2. The second CDN 110-2 is connected to a third end-user system 102-3 via a third terminal network 304-3.

The first terminal network 304-1 has a terminal-network cache 408. Although only one terminal-network cache 408 is shown, in some embodiments each terminal network 304 has a terminal-network cache 408. The terminal-network cache 408 stores content objects. Also connected to the Internet 104 are a content provider 108, a mediator system 308, and a rules repository 404. The content provider 108 contracts with the mediator system 308, a CDN 110, and/or a terminal network 304 to distribute content over the Internet 104.

In some embodiments, terminal networks 304 form a peer relationship and contract with a CDN 110 for delivery of content outside the terminal network 304 peer relationship. For example, the first terminal network 304-1 and the second terminal network 304-2 are connected in a peer relationship. But the third terminal network 304-3 is not part of the peer relationship. When the third end-user system 102-3 requests a content object provided by either the first terminal network 304-1 or the second terminal network 304-2, the request is passed to the second CDN 110-2. The second CDN 110-2 fulfills the request from the third end-user system 102-3. The second CDN 110-2 then reports delivery of the content object to the mediator system 308. In some embodiments, the first terminal network 304-1, the second terminal network 304-2, and/or the third terminal network 304-3 (e.g., the second CDN 110-2 subcontracting delivery to the third terminal network 304-3) report delivery of the content object to the mediator system 308 in lieu of, or in addition to, the second CDN 110-2 reporting delivery. In some embodiments, a unique ID is given to a content object request. The unique ID is passed in response headers. The mediator system 308 aggregates log files and determines a delivery path of the content object. The second CDN 110-2 and/or third terminal network 304-3 are compensated for delivery of the content object. In some embodiments, the second CDN 110-2 references the rules repository 404 for control parameters in fulfilling the request from the third end-user system 102-3.

In some embodiments, a terminal network 304 delivers a content object for a CDN 110. For example, the first end-user system 102-1 requests a content object from the first CDN 110-1. The first terminal network 304-1 intercepts the request and checks for the content object in the terminal-network cache 408. Finding the content object in the terminal-network cache 408, the first terminal network 304-1 queries the rules repository 404 for control parameters regarding the content object. The first terminal network 304-1 then delivers the content object to the first end-user system 102-1 based on the control parameters.

Figure 5:
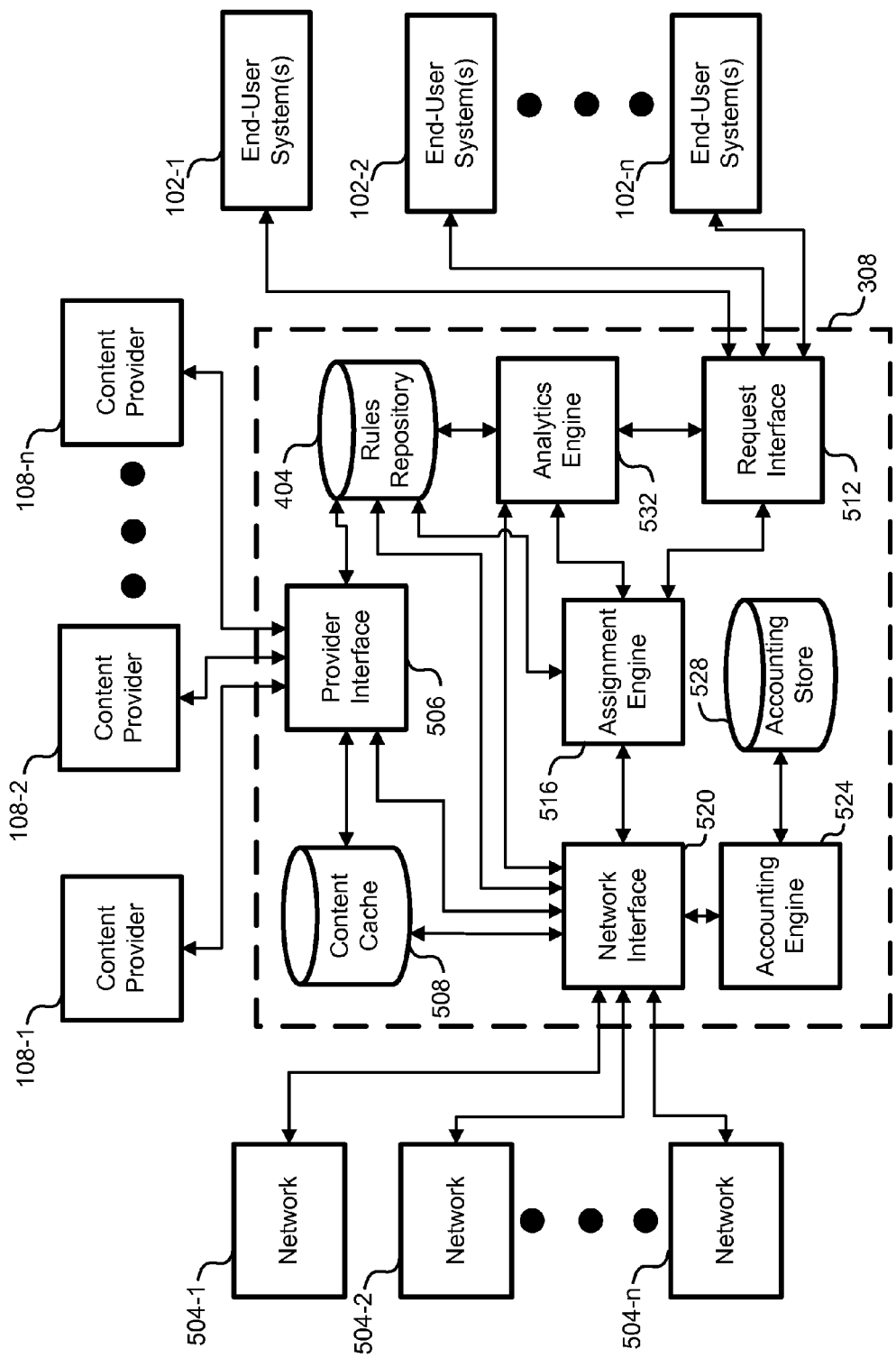
FIG. 5 depicts a block diagram of an embodiment of a mediator system in a cooperative delivery system.

Referring next to FIG. 5, a block diagram of an embodiment of a mediator system 308 in a cooperative delivery system is shown. The mediator system 308 is connected to a plurality of end-user systems 102, a plurality of content originators 106, the and a plurality of networks 504. A network 504 is a CDN 110 and/or a terminal network 304. In the embodiment depicted in FIG. 5, the mediator system 308 comprises several features: a provider interface 506, a content cache 508, a request interface 512, an assignment engine 516, a network interface 520, an accounting engine 524, an accounting store 528, an analytics engine 532, and a rules repository 404. In other embodiments, the mediator system 308 has only a subset of features. For example, in some embodiments, the mediator system 308 comprises the network interface 520, the accounting engine 524, and the accounting store 528, but not other features. Features can be implemented or left out depending on desired functionality. In some embodiments, the mediator system 308 is managed or controlled by an entity independent from the networks 504 and content originators 106.

The provider interface 506 is connected to the plurality of content originators 106. In some embodiments the provider interface 506 is connected to the plurality of content originators 106 through the Internet 104. Content originators 106 contract with the mediator system 308 though the provider interface 506 for content delivery. In some embodiments, the provider interface 506 receives a copy of content objects from the content originators 106. The provider interface 506 stores content objects received from content originators 106 in the content cache 508 and/or to a network 504. For example, the first network 504-1 is a "pure-play" content delivery network and the provider interface 506 sends a first content object from a first content provider 108-1 to the first network 504-1 for storage; the first network 504-1 then provides the first content object like an origin server 112 for cache misses in the cooperative delivery system. In other embodiments, the provider interface 506 stores the first content object in the content cache 508. The content cache 508 then acts as an origin server 112 for cache misses. The content cache 508 could be a single storage device or a plurality of storage devices. In some embodiments, the content provider 108 retains the role of being the origin server 112. In some embodiments, a network 504 may want to transition delivery of content to the mediator system 308. A network 504 acting in a role of transitioning delivery of content to the mediator system 308 would then be considered a content provider 108 for that role.

In some embodiments, the provider interface 506 receives control parameters from content originators 106. Control parameters relate to delivery and/or caching of content objects. In some embodiments, control parameters are stored in the rules repository 404. In some embodiments, the rules repository receives control parameters from the networks 504, the analytics engine 532, and/or the assignment engine 516. In some embodiments, a control parameter specifies delivery requirements, such as a quality of service level that must be met to deliver the content object. In some embodiments, the control parameter specifies a minimum or maximum bandwidth for delivering the content object.

In some embodiments, the control parameter specifies a time window for delivering a content object. For example the control parameter specifies a start time for delivery for the content object. Thus a video content object that is a movie could be prepopulated in different networks 504. The control parameter specifies a time and/or date one year after the movie was released in theatres. In some embodiments, the control parameter specifies a cut-off, or stop time. For example, a control parameter could specify not to deliver a content object after Jan. 8, 2014 for a New Year's Celebration recorded Dec. 31, 2013. In some embodiments, both a start time and a stop time are given in a control parameter for the content object. In some embodiments, the control parameter specifies a certain time of day the content object is permitted to be delivered. For example, the control parameter specifies that the content object can only be delivered during a time from 10 pm to 4 am. The time is based on one time zone or a time zone of the end-user system 102. For example, the one time zone could be based on a time zone of a particular POP 120 so that content is delivered from the particular POP 120 during off-peak time. In another example, the time is based on the end-user system 102. A terminal network 304 provides information for the time zone of the end-user system 102. An example of using the time zone of the end-user system 102 would be to delay users in California from receiving a New Year's Celebration recorded in New York, so that users in California receive the New Year's Celebration closer to midnight California time. In some embodiments, the control parameter provides information when a CDN 110 is more willing to take delivery requests from other CDNs 110 and/or terminal networks 304. For example, the first CDN 110-1 may use a control parameter to pass information to the second CDN 110-2 that the first CDN 110-1 will take delivery requests for the second CDN 110-2 from 10 pm to 4 am ("off peak" hours) in a time zone of the first CDN 110.

In some embodiments, the control parameter specifies how the content object should be cached, separate from an HTTP time-to-live header. For example, the control parameter specifies the content object should not be cached. Or, the control parameter could specify the content object should be cached for longer than the HTTP time-to-live header. In some embodiments, the control parameter comprises instructions to purge a content object from a cache, or to purge the content object from the cache if the cache is in a certain geography. For example, the control parameter specifies that all caches in Europe, that are part of the cooperative delivery system, should purge the content object. In some embodiments, the control parameter specifies a file size of the content object. Thus a determination can be made whether or not to cache the content object, or how much of the content object to cache. For example, for a large video file, a terminal network 304 knowing a size of the large video file may determine to cache only the first five minutes of the large video file.

In some embodiments, a control parameter specifies a subset of networks 504 that are authorized to deliver the content object. For example the control parameter specifies that the first network 504-1 is authorized to deliver the content object but does not specify the second network 504-2. In some embodiments, some networks are expressly excluded from delivering a content object. For example, the control parameter states that the second network 504-2 is not to deliver the content object. In some embodiments, the control parameters identify capabilities that a network 504 should and/or must have to deliver the content object. For example, a control parameter could specify that a network 504 should be able use encode the content object into eight different formats and must be able to encode the content object into three different formats. In another example, a control parameter specifies that a network 504 must be able to use TCP fast open and/or split TCP protocols in delivering a content object. In some embodiments, the control parameter specifies a network 504 and/or content provider 108 of where the content object came from. In some embodiments, the control parameters specify a particular server that is part of delivering the content. In some embodiments, the control parameter specifies a geographic restriction for delivering the content object (e.g., geo blocking). In some embodiments, the control parameter is a hash validation.

In some embodiments, the control parameter specifies who will pay for delivery of the content object, contract information for who will pay for the delivery of the content object, and/or how much will be paid for the delivery of the content object. For example, a CDN 110 may be willing to pay a terminal network 304 for delivering a content object. Thus the control parameter, for a given content object, would specify the CDN 110 and/or how the terminal network 304 should contact the CDN 110 for payment. In some embodiments, payment options for delivery of the content object are provided. For example, the payment options could include a flat fee for delivery or variable payment based on providing a higher quality of service and/or bandwidth. The variable payment could be based on a time of day for delivery. For example, a content provider 108 may be willing to pay a higher cost for delivery of the content object during network-peak hours, such as a weekend evening. But the content provider 108 may not be willing to pay as much for content delivery at 3 am.

The request interface 512 of the mediator system 308 receives requests for content available over the Internet 104 from a plurality of end-user systems 102. The request interface 512 passes requests for content to the assignment engine 516. In some embodiments, the request interface 512 also passes request information to the analytics engine 532.

The assignment engine 516 receives a request for a content object from the request interface 512 and selects a network 504 to fulfill the request. There are various ways the assignment engine 516 selects a network 504 to fulfill the request for the content object. In some embodiments, the assignment engine 516 selects the a network 504 based on a load-balancing algorithm such as round-robin. In some embodiments, the assignment engine 516 selects the a network 504 by a quality of service such as availability, low latency, low cost, network location, or a combination of factors.

In some embodiments, the assignment engine 516 queries the rules repository 404 for one or more control parameters relating to the content object. For example, a control parameter could stipulate that the content object should be delivered by a network 504 with the highest quality of service. The assignment engine 516 would then choose a network 504 of the plurality of networks 504 with the highest quality of service based on predetermined service contracts, recent network 504 performance reports, historical network 504 performance, and/or near real-time network 504 performance data.

In some embodiments, the one or more control parameters may be so restrictive that no network 504 meets criteria of the one or more control parameters. In a situation where no network 504 meets the criteria of the one or more control parameters, default instructions are implemented. In one example default instruction, the delivery of the content object is assigned back to the content provider 108 via the provider interface 506. In another default instruction, a default network 504 is assigned. For example, the first network 504-1 is a pure-play CDN 110. The first network 504-1 is assigned to deliver a particular content object as a default where no networks 504 meet the criteria of the one or more control parameters for delivering the particular content object. Other default instructions include finding a best fit, random, or using a load balancing algorithm are implemented in various embodiments.

In some embodiments, delivery of content objects is divided into physical geography. For example, the first network 504-1 is assigned to deliver content objects in the United States, and the second network 504-2 is assigned to deliver content objects in South America. For a request coming from an end-user system 102 in South America, the second network 504-2 would be chosen.

In some instances, a subset of networks 504 qualify to deliver the content object. When a subset of networks 504 qualify to deliver the content object, the assignment engine 516 would assign a network 504 of the subset of networks 504 based on a load-balancing algorithm such as round-robin, by network 504 quality of service such as availability/latency, cost, network location, a network 504 being considered a preferred network 504, or a combination of such factors. For example, the first network 504-1 is assigned to deliver content objects in the United States and the second network 504-2 is assigned to deliver content objects to South America. For an end-user system 102 request from Mexico, the assignment engine 516 could select the first network 504-1 based on the first network 504-1 being a pure-play CDN 110 and the first network 504-1 being a preferred network when more than one network 504 qualifies to deliver the content object.

In some embodiments, the assignment engine modifies a URI to pass control parameters to a network 504. In some embodiments, modifying the URI comprises inserting a string of text into the URI that references one or more control parameters. The string is created such that the URI is recognizable to the networks 504 as a modified URI. In some embodiments, a hash function is used to identify different control parameters. In some embodiments, the hash function is used to ensure a request has not been tampered with and/or the mediator system 308 is not being spoofed in proving a content object. In some embodiments, the hash function is used to both identify one or more control parameters and ensure the request has not been tampered with. A hash is then inserted as the string in the URI. In some embodiments, the network 504 references a look-up table to match the string with one or more control parameters.

In some embodiments, a data packet is used to pass control parameters to the network 504 assigned to deliver the content object. In some embodiments, both a modified URI and a data packet are used to pass control parameters. The data packet contains similar information that can be included in a modified URI. Table I below provides an example of data in a data packet used to pass control parameters.

TABLE I

Control-Parameter Packet

| Field | Example |
|---|---|
| Request Identifier | 34sd89732k |
| Recipient IP Address | 69.93.18.222 |
| Geographic Location | San Francisco |
| Domain of Content Object | LLNW.com |
| Path of Content Object | /press/2005releases/ |
| File Name of Content Object | routemark.mp4 |
| Format | MPEG4 |
| Bitrate | 200 Kbps |
| Min. QoS Level | 2 |
| Subcontracting Allowed | No |
| Caching | 14400 |
| Earliest Delivery | 20131231 2200 LT |
| Latest Delivery | 20140107 2399 LT |
| Price per delivery | .03/.05 |
| Max. Volume | 1001 |

In the example Table I above, a request identifier is given. The request identifier is a unique value and is used to correlate an assignment to delivery report(s). The geographic location is based on the recipient IP address. In some embodiments, geographic location is determined by information received from a terminal network 304. In this example, predetermined quality of service (QoS) levels are established and given numbers: 1, 2, 3 . . . , where level 1 is the highest QoS level. The sample control parameter packet above does not allow the network 504 assigned to deliver the content object to pass the content object to another network for delivery (i.e., subcontracting allowed=no). Caching is given in units of seconds, and in this example, the content object is to be kept in a cache of the network 504 assigned to deliver the content object for four hours (i.e., caching=14400 seconds). The earliest delivery and latest delivery are dates and time with "LT" standing for local time, i.e., the time of the geographic location. In this example, the earliest delivery time is 31 Dec. 2013 at 10:00 pm local time. A price per delivery is give as three cents if the content object is delivered with a QoS level of 2, and five cents if delivered with a QoS level of 1. The maximum volume is a preauthorization for the network 504 assigned to deliver the content object to also respond up to a thousand more requests for the same content object. For example, the network 504 assigned to deliver the content object is a large ISP in San Francisco, Calif. area. The content object is a video of a New Year's celebration in New York. As other end users 128, which are customers of the large ISP in San Francisco, request the video of the New Year's celebration, the large ISP intercepts the requests and delivers the content object from a cache of the large ISP. In some embodiments, certain control parameters are determined by an existing contract. For example, the control parameter packet may not need to include the price per delivery if that was previously contracted.

In some embodiments, the assignment engine 516 sends notifications to networks 504. The notifications can be used to enforce network and application level configuration changes. For example, a content originator may send instructions through the provider interface 506 for all current versions of a content object be deleted from network 504 caches and a new version of the content object disseminated. The assignment engine 516 then sends out a request to either selected networks 504, or all networks 504, to delete the current version of the content object from network 504 caches. For example, if the first content provider 108-1 received a take-down notice under the Digital Millennium Copyright Act (DMCA), the first content provider 108-1 could request the mediator system 308 to have all networks 504 with caches of the content object in the United States, or a US territory, purge the content object of the caches. A control parameter identifying the content object and a request to purge the content object from caches in the US, or US territory, would be sent as a notification all networks 504, or just networks identified as operating in the US. In another example, a notification would be sent to all networks 504 to delete the content object from all caches, worldwide.

The network interface 520 sends and receives information to and from the networks 504. The network interface 520 passes assignments from the assignment engine 516 to the networks 504. In some embodiments, when a network 504 assigned to deliver a content object has a cache miss, the network interface 520 retrieves the content object from the content cache 508. The network interface 520 passes assignment information to the accounting engine 524. The network interface 520 receives delivery reports from the networks 504, and passes the delivery reports to the accounting engine 524 and/or the analytics engine 532. In some embodiments, the network interface 520 receives requests from networks 504 for control parameters. The network interface retrieves the control parameters from the rules repository 404.

In some embodiments, the network interface 520 sends and receives information for adapting content (e.g., inserting advertisements). The mediator system 308 receives, at the network interface 520 and/or the request interface 512, information about end-user systems 102 from a network 504. For example, the mediator system 308 receives information from the second network 504-2, in the form of a control parameter, that the first end-user system 102 is located near 35th Street and Broadway in New York City; the second network 504-2 is an ISP. The first end-user system 102-1 requests a content object provided by the first network 504-1; the first network 504-1 is a pure-play CDN. The mediator system 308 provides the first network 504-1 the request for the content object and location of the first end-user system 102-1. In delivering the content object to the first end-user system 102-1, the first network 504-1 modifies a manifest so that the first end-user system 102-1 receives local advertising directed to users in downtown New York City inserted into delivery of the content object. In some embodiments, the first end-user system 102-1 could receive national, regional, and/or local advertisements. In some embodiments, content is adapted based on location, device capabilities, and/or device type.

In some embodiments, business logic from one network is passed to another network. For example, the first network 504-1, a pure-play CDN, passes business-logic information to the second network 504-2, an ISP. When the second network 504-2 receives a request at an end node, to be fulfilled by the first network 504-2, the second network 504-2 makes a decision, at the end node, on where to route the request based on the business-logic information received from the first network 504-1.

In some embodiments, passing control parameters allow networks 504 to cooperate in performing acceleration techniques. For example, networks 504 cooperate on providing last mile QoS, precise GeoIP targeting, split TCP, Explicit Congestion Notification (ECN), and TCP Fast Open (TFO). Additionally, in some embodiments, networks 504 cooperate to perform byte caching. For example, a terminal network 304 caches parts of web pages that are "above the fold" while a CDN 110 caches a remainder of the web page.

In some embodiments, one network 504 analyzes different instances of content being downloaded to improve caching efficiency for another network 504. For example, the second network 504-2, an ISP, analyzes what end users 128 are requesting, such as content items for a web page. The second network 504-2 passes information on what end users 128 are requesting to the first network 504-1, a CDN. The first network 504-1 uses the information on what end users 128 are requesting to determine to cache certain content, or portions on content. In another example, the first network 504-1 and the second network 504-2 use the information on what end users 128 are requesting to perform acceleration techniques, such as combining several content items into a single object and caching the single object in a cache of the second network 504-2. The first network 504-1 could then alter a cache manifest to look for the single object in the cache of the second network 504-2.

In some embodiments, control parameters allow networks 504 to extend authentication of end users 128 to other networks 504.

In some embodiments, a network 504 will execute code from another network 504. In one example, the second network 504-2 executes code from the first network 504-1 in a resource of the second network 504-2 to perform acceleration techniques of the first network 504-1. In another example, the second end-user system 102-2 is a smart TV that has a capability to render MPEG2 and MPEG4 but does not have the capability to render HTML. The second end-user system 102-2 requests an HTML content object from the first network 504-1. The second network 504-2 has a server closer to the second end-user system 102-2 than the first network 504-1. The first network 504-1 provides the second network 504-2 code, either previously or upon request, to stich HTML into MPEG4. The second network 504-2 then instantiates a virtual machine on a server of the second network 504-2 to provide the content object to the second end-user system 102-2.

The accounting engine 524 receives and processes delivery reports generated by networks 504. Some delivery reports are given for a single delivery to a single end-user system 102. Some delivery reports aggregate data for deliveries to two or more end-user systems 102. An example of a single delivery report is given in table II below.

TABLE II

Single Delivery Report

| Field | Example |
|---|---|
| Request Identifier | 34sd89732k |
| Recipient IP Address | 69.93.18.222 |
| Geographic Location | San Francisco |
| Network Type | Terminal Network |
| Domain of Content Object | LLNW.com |
| Path of Content Object | /events/2013events/ |
| File Name of Content Object | 1231NYCnewyearscelebration.mp4 |

TABLE II-continued

Single Delivery Report

| Field | Example |
| --- | --- |
| Format | MPEG4 |
| Delivered | yes |
| QoS Level | 1 |
| Bandwidth | 38850 Kbps |
| Delivery start | 20131231 2205 LT |
| Size | 156232131 |
| Encryption | none |

In the example of the single delivery report in Table II above, bandwidth refers to a bandwidth provided to an end-user system 102 by a terminal network 304. The bandwidth is averaged over a time period for delivering the content object. QoS level refers to a QoS level provided to the end-user system 102. Size refers to a how many bytes of information were delivered to the end-user system 102. In some embodiments, size is rounded, such as to a nearest kilobyte or megabyte. In some embodiments, duration, a number of seconds of video downloaded to the end-user system 102 is reported in addition to, or in lieu of, the size. In some embodiments, delivery compensation is based on the duration, the amount of data downloaded to the end-user system 102, and/or a duration or percentage of the content object played on the end-user system 102. In some embodiments, a latency parameter of the network 504 is also provided. In some embodiments encryption is used and a network 504 must be able to provide certain encryption capabilities.

In some embodiments, a network 504 and/or the accounting engine 524 generate an aggregated delivery report. An example of an aggregated delivery report is given in table III below. In the example of the aggregated delivery report, the content object was delivered 352 times at a QoS level 1 to end-user systems 102 and 563 times at a QoS level 2 to end-user systems 102. Amount is a total amount of data, in bytes, transmitted to end-user systems 102 in delivering the content object. Additionally, a first delivery of the content object started on 31 Dec. 2013 at 10:00 pm local time, and a last delivery ended on 6 Jan. 2014 at 3:32 pm local time.

TABLE III

Aggregated Delivery Report

| Field | Example |
| --- | --- |
| Request Identifier | 34sd89732k |
| Geographic Location | San Francisco |
| Domain of Content Object | LLNW.com |
| Path of Content Object | /events/2013events/ |
| File Name of Content Object | 1231NYCnewyearscelebration.mp4 |
| Format | MPEG4 |
| Delivered | 563/352 |
| Size | 25456251322/54993710112 |
| Amount | 80449961434 |
| First Delivered | 20131231 2200 LT |
| Last Delivered | 20140106 1532 LT |

In some embodiments, the accounting engine 524 accepts that networks 504 deliver content objects according to reports received from the networks 504 and/or delivery assignments received from the network interface 520. In other embodiments, the accounting engine 524 receives test data from the analytics engine 532. The accounting engine 524 requests the analytics engine 532 run performance tests, such as pinging a server or end-user system 102 over a network 504. The accounting engine 524 uses the performance tests to verify network 504 performance. In some embodiments the accounting engine 524 receives reports from two or more networks 504. For example, the first network 504-1 is a pure-play CDN and the second network 504-2 is an ISP connected to the first end-user system 102-1. For a content delivery from the first network 504-1 to the first end-user system 102-1, the accounting engine receives delivery reports from both the first network 504-1, which is the pure-play CDN, and the second network 504-2, which is the ISP. The accounting engine 524 then compares network-performance data, such as QoS and latency, reported from both the first network 504-1 and the second network 504-2. In some embodiments, the accounting engine 524 receives network-performance data from an end-user system 102. For example, a browser-based video player beacons network-performance data, with other data used to generate reports such as an amount of video played on the browser-based video player, to the mediator system 308 and/or the network 504.

In some embodiments, the accounting engine 524 creates and/or consolidates reports received from information received from the networks 504, the network interface 520, the analytics engine 532, and/or the end-user systems 102 to generate content-originator reports. A sample content-originator report is depicted in table IV below. In some embodiments, the content-originator report includes more than one content object. In some embodiments, the accounting engine 524 also provides reports to the networks 504 listing content objects delivered for different content originators 106.

TABLE IV

Content-Originator Report

| Field | Example |
| --- | --- |
| Content Originator | AA News Network |
| Path of Content Object | /events/2013events/ |
| File Name of Content Object | 1231NYCnewyearscelebration.mp4 |
| Format | MPEG4 |
| Report Dates | 20140101-20140131 |
| Network 1 | LLNW |
| Deliveries | 5674/2396 |
| Cost | .03/.05 |
| Network 2 | Skandi Telecom |
| Deliveries | 118 |
| Cost | .03 |

The accounting store 528 is connected to the accounting engine 524. The accounting store stores reports used by the accounting engine 524, such as delivery reports and content-originator reports. The accounting store 528 also keeps records of billing contact information for content originators 106, networks 504, and/or end users 128. In some embodiments, the mediator system 308 receives payment from the content provider 108 and/or pays the networks 504 based on the stored reports. In some embodiments, the analytics engine 532 pulls reports in the accounting store 528 for processing. In some embodiments, reports are generated after reaching a threshold. For example, content-originator report is generated after a content object is delivered 500 times total.

The analytics engine 532 develops and tracks information, such as statistics, for various parts of the cooperative delivery system. The analytics engine 532 receives request information from the request interface 512. The analytics engine 532 receives assignment information from the assignment engine 516. The analytics engine 532 receives information about the networks 504 through the network interface 520. The analytics engine 532 modifies and/or creates control parameters in the rules repository 404.

In some embodiments, the analytics engine 532 prepares heat maps of how popular a content object is for a given network 504, demographic, and/or geography based on the request information. For example, the analytics engine 532 identifies a Spanish-language video that is gaining popularity in Mexico. In response to identifying the Spanish-language video, the analytics engine modifies a control parameter. Changing the control parameter(s) could include such modifications as increasing a caching duration of the content object in Mexico and the southwest United States, or for POPs in the southwest United States to pre-populate caches.

In some embodiments, the analytics engine 532 tracks performance of the networks 504. The analytics engine 532 tracks performance of the networks 504 by receiving reports from the networks 504 and/or conducting tests on the networks 504. By monitoring performance of the networks 504, the analytics engine determines which networks 504 are at or near capacity. For a network 504 at or near capacity, requests could be assigned a different network 504. In some embodiments, the networks 504 provide information about performance of the network 504 and capabilities of the network 504 (e.g., ability transcode content objects into different formats, cache size, geographic placements of POPs, protocols used such as TCP fast open, etc.). In some embodiments, the analytics engine 532 calculates and/or estimates delivery costs of the networks 504. In some embodiments, the analytics engine 532 uses information the analytics engine 532 receives and/or produces to assist the assignment engine 516 in selecting a network 504 to assign a request for a content object. Information from the analytics engine 532 can help the assignment engine 516 in load balancing networks 504.

In some embodiments, the analytics engine 532 knows, or predicts, a network 504 that already has the content object. For example, the assignment engine 516 assigns the second network 504-2 to deliver a first content object. A four-hour caching timeframe is given to the second network 504-2. Two hours later, the mediator system 308 receives a second request for the content object. The analytics engine 532 notifies the assignment engine 516 the second network 504-2 likely has the content object in cache. The assignment engine 516 assigns the second network 504-2 to deliver the content object to fulfill the second request for the content object. In some embodiments, whether or not a content object is in a cache of a network 504 is just one factor of several the assignment engine 516 considers when assigning a network 504 to deliver a content object.

Though FIG. 5 shows the mediator system 308 separate from the networks 504, in some embodiments some or all functions of the mediator system 308 are embedded in one or more of the networks 504.

Figure 6:
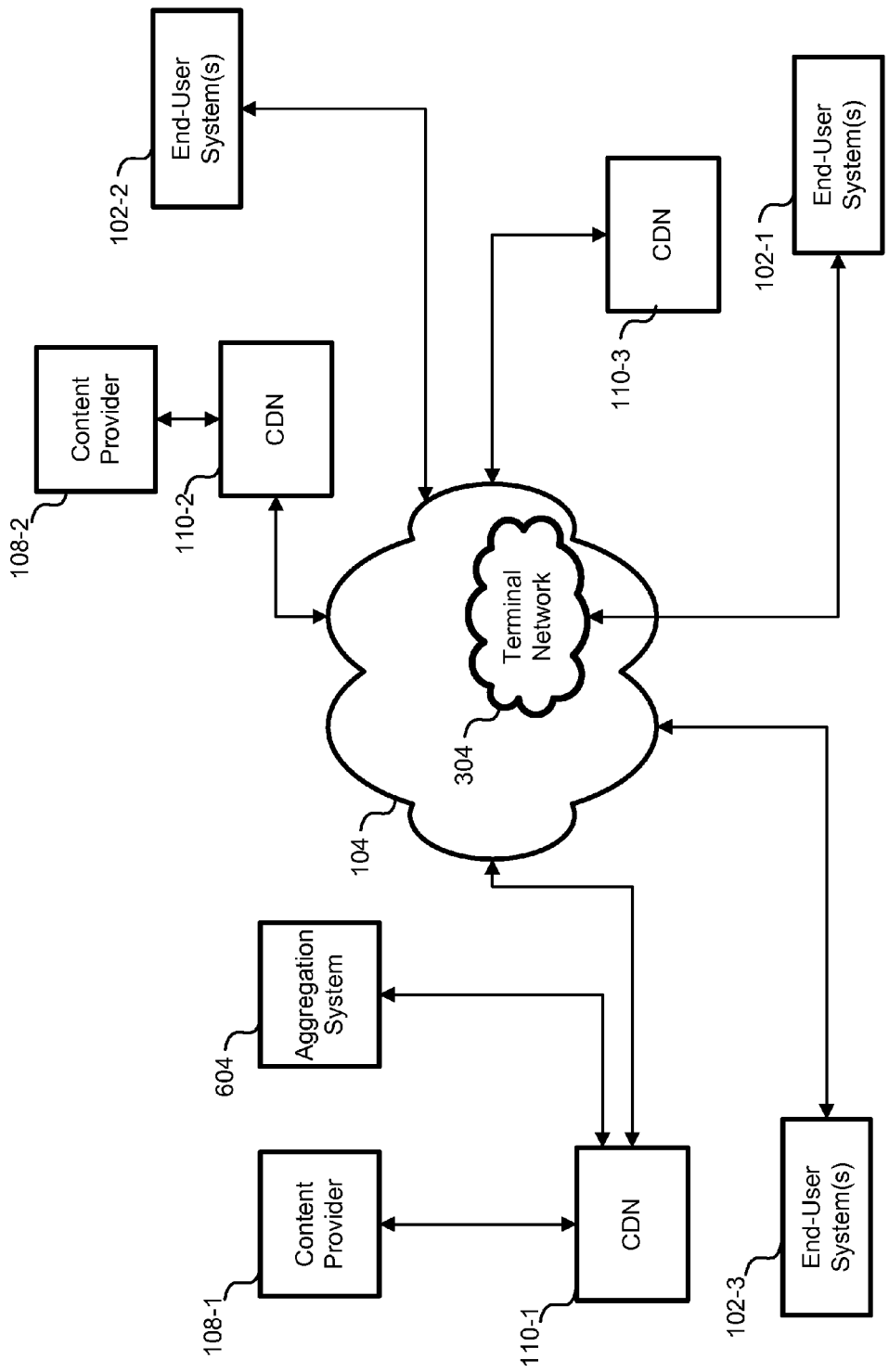
FIG. 6 depicts a block diagram of an embodiment of a cooperative delivery system having an aggregation system.

Referring next to FIG. 6, a block diagram of an embodiment of a cooperative delivery system with an aggregation system 604 is shown. A plurality of CDNs 110 and end-user systems 102 are connected via the Internet 104. A first content provider 108-1 is connected to a first CDN 110-1. In some embodiments, the first content provider 108-1 is connected to the first CDN 110-1 via the Internet 104. The first CDN 110-1 is also connected to an aggregation system 604. A second content provider 108-2 is connected to a second CDN 110-2. A first end-user system 102-1 is connected to the Internet 104 via the terminal network 304.

The aggregation system 604 functions similarly to the mediator system 308, except, unlike the mediator system, the aggregation system 604 is not managed or controlled by neutral party. The aggregation system 604 is tied to the first CDN 110-1. In some embodiments, the aggregation system 604 is embedded with in a POP of the first CDN 110-1. The first content provider 108-1 contracts with the first CDN 110-1 to distribute a first content object. The second content provider 108-2 contracts with the second CDN 110-2 to deliver a second content object. The first CDN 110-1, the second CDN 110-2, and the third CDN 110-3 are distributed geographically. The third end-user system 102-3 and the first CDN 110-1 are in a first geographic region. The second end-user system 102-2 and the second CDN 110-2 are in a second geographic region. The first end-user system 102-1, the third CDN 110-3, and the terminal network 304 are in a third geographic region.

In some embodiments, the first CDN 110-1, the second CDN 110-2, and the third CDN 110-3 agree to deliver each other's content without fee. In some embodiments, the CDNs 110 and/or the terminal network 304 have contracts with each other to deliver each other's content for set costs. In some embodiments, the CDNs 110 and the terminal network 304 provide the aggregation system 604 prices for which the CDN 110 and terminal network 304 will deliver a content object for. The CDNs 110 the terminal network 304 provide prices for content delivery to the aggregation system 604 either in advance, in real time, or in response to a request deliver the content object. In some embodiments a CDN 110 will make an offer for a delivery cost. For example, the second CDN 110-2 offers the first CDN 110-1 (via control parameters), five cents to deliver a content object. The first CDN 110-1 can accept the offer and deliver the content object.

In one example, the first end-user system 102-1 request the first content object from the first CDN 110-1. The first CDN 110-1 has a contract with the third CDN 110-3 to deliver content objects in the third geographic region. The aggregation system 604 assigns the third CDN 110-3 to deliver the first content object to the first end-user system 102-1. The first CDN 110-1 has a contract with the second CDN 110-2 deliver content objects in the second geographic region. When the second end-user system 102-2 requests the first content object, the aggregation system 604 assigns the second CDN 110-2 to deliver the first content object to the second end-user system 102-2. When the first CDN 110-1 receives a request for the first content object from the third end-user system 102-3, the aggregation system 604 assigns first CDN 110-1 to deliver the first content object to the third end-user system 102-3.

Figure 7:
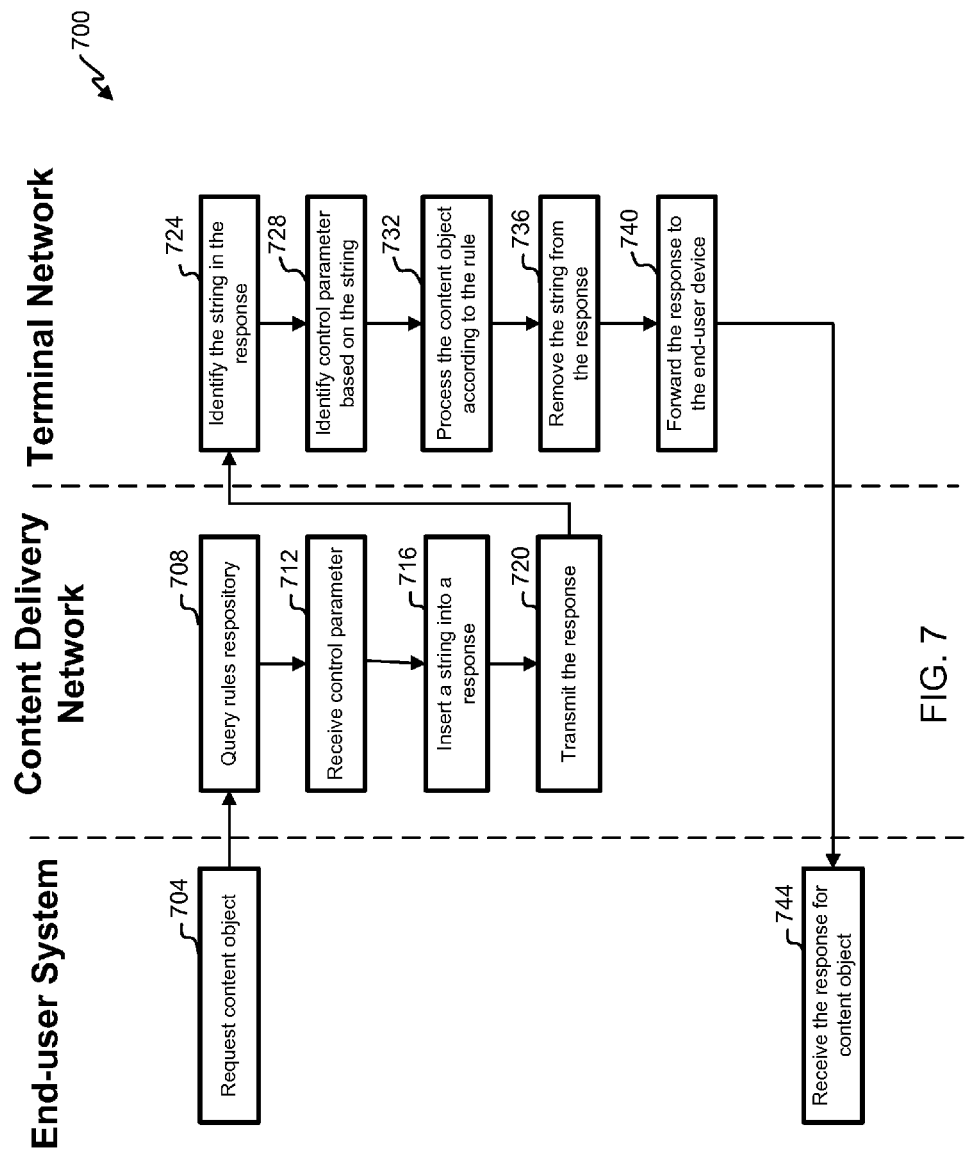
FIG. 7 illustrates a swim diagram of an embodiment of a method for controlling delivery of a content object in a cooperative delivery system.

Referring next to FIG. 7, a swim diagram of an embodiment of a method 700 for controlling delivery of a content object in a cooperative delivery system is illustrated. Controlling delivery of a content object can be between the mediator system 308 and a network 504, the aggregation system 604 and a network 504, a CDN 110 and a terminal network, a first CDN 110-1 and a second CDN 110-2, or between a first terminal network 304-1 and a second terminal network 304-2. In the embodiment illustrated in FIG. 7, controlling delivery of a content object is between CDN 110 and a terminal network 304. Also in the embodiment illustrated in FIG. 7, the CDN 110 comprises an aggregation system 604.

The method 700 begins in block 704 with an end-user system 102 requesting the content object. The CDN 110 receives a request for the content object from the end-user system 102 and queries the rules repository 404 for a control parameter, block 708. The CDN 110 receives a control parameter from the rules repository 404, block 712. The CDN 110 inserts a string into a URI of a response to the end-user system 102 for the content object that identifies the control parameter, block 716. The CDN 110 transmits the response to the end-user system 102 with the string in the URI specifying the control parameter, block 720. The response to the end-user system 102 is routed through the terminal network 304.

Terminal network 304 is operated by a different entity than an entity that operates the CDN 110. The terminal network receives the response to the end-user system 102 and identifies the string contained in the URI of the response to the end-user system 102, block 724. In block 728, the terminal network 304 identifies the control parameter based on the string. The terminal network 304 processes the content object and/or stores the content object according to the control parameter, block 732. The terminal network 304 delivers the content object to the end-user system 102.

In some embodiments, the terminal network 304 removes the string from the response to the end-user system 102, block 736. After removing the string from the response to the end-user system 102, terminal networks 304 forwards the response to the end-user system 102, block 740. The end-user system 102 receives the content object, block 744. In some embodiments, control parameters are passed through HTTP headers. In some embodiments, control parameters are passed out of band (e.g., in a control parameter packet).

In some embodiments, a time-to-live value is provided in the header of the response. The control parameter specifies the content object should be cached for a longer duration than the time-to-live value in the header of the response. The terminal network 304 caches the content object according to the control parameter instead of the time-to-live value in the header. In some embodiments, a control parameter specifies the content object should not be cached. And the terminal network 304 does not cache the content object instead of caching the content object according to the time-to-live value in the header.

In some embodiments, the control parameter comprises metrics for how popular the content object is. The terminal network 304 determines whether or not, or for how long, to cache the content object based on the metrics for how popular the content object is. The metrics may include popularity for given geography. For example, a content object may be popular in Russia but not Spain. The metrics may include popularity for a given demographic. For example, a POP in San Francisco may determine to cache a content object that is popular in China for longer than the given time-to-live parameter. The metrics may include overall popularity for a content object. For example, a content object may be the third most request content object in a given network 504, a subset of networks 504, or across all networks 504 of a cooperative delivery system. In some embodiments, the control parameter comprises information on whether the content object is increasing, or decreasing, in popularity and by how much. The metrics may include differences in popularity of a content object in different networks 504. For example, the popularity of a content object may be increasing in popularity in a first network 504-1, and decreasing in popularity in a second network 504-2. The metrics may also include popularity for different time zones.

In some embodiments, when a content object is ingested into the CDN 110, the content object is assigned a URI. The URI assigned to the content object is created in such a way as to identify the content object and one or more control parameters. A control-parameter table correlates a portion of the URI to one or more control parameters. In some embodiments, the control-parameter table is kept in a central location. In some embodiments, the control-parameter table is distributed to one or more of the networks 504.

Figure 8:
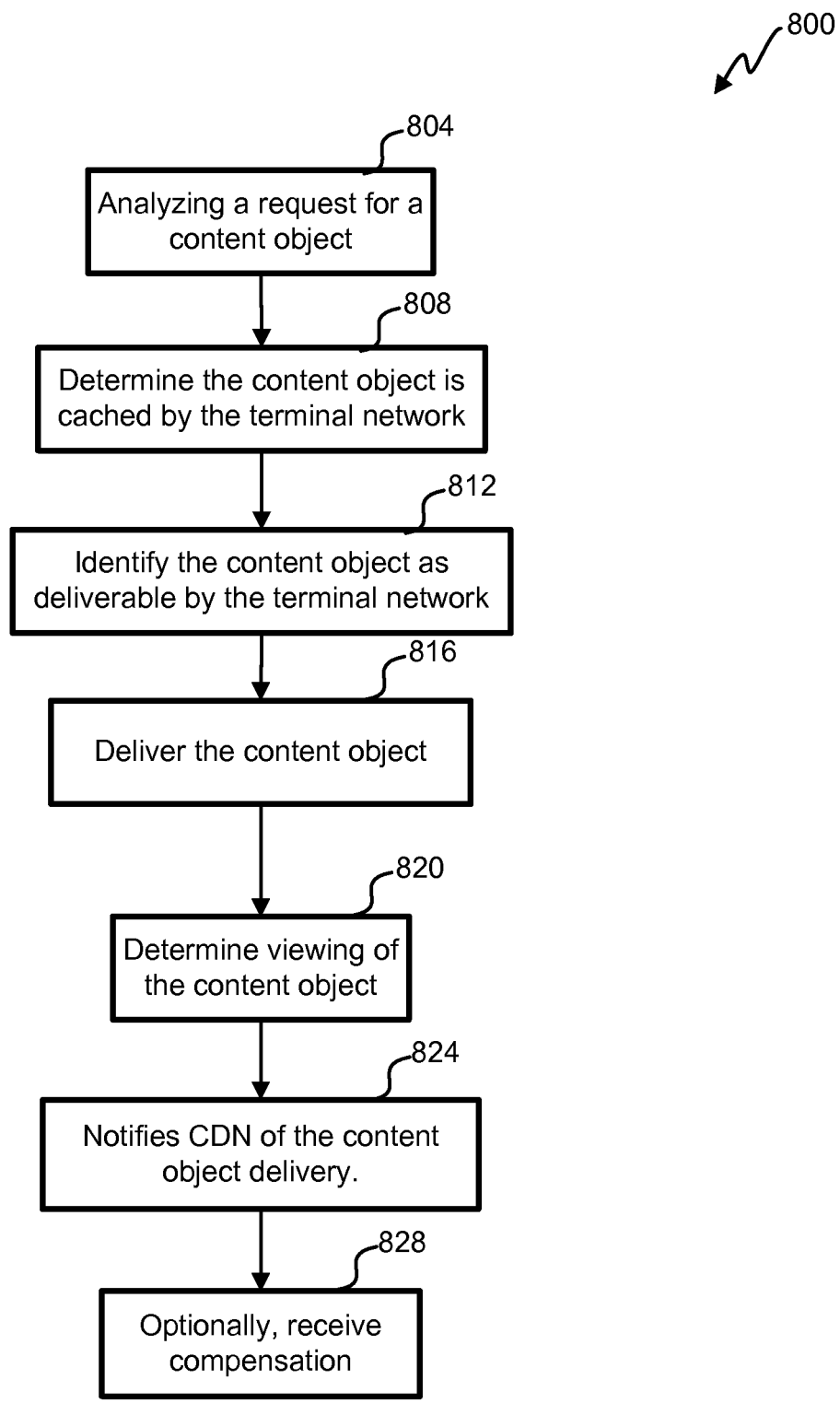
FIG. 8 illustrates a flowchart of an embodiment of a method for delivering content objects from terminal network caches in a cooperative delivery system.

Referring next to FIG. 8, an illustration of a flowchart of an embodiment of a method 800 of delivering content objects from a terminal network 304 cache in a cooperative delivery system is shown. The method 800 begins in step 804 where a terminal network 304 reads, or intercepts, a request for a content object. The request for the content object originates from an end-user system 102. In some embodiments, a CDN 110 or other network 504 is contracted, by a content provider 108, to deliver the content object. The terminal network 304 queries a terminal-network cache 408 in the terminal network 304 for the content object. The terminal network 304 determines the content object is in the terminal-network cache 408, step 808.

In step 812, the terminal network 304 identifies the content object as deliverable by the terminal network 304. In some embodiments, identifying the content object is deliverable by the terminal network 304 means that the terminal network 304 will be compensated by another network 504, and/or the content provider 108, for delivering the content object from the terminal-network cache 408. There are various ways the terminal network 304 can identify the content object is deliverable by the terminal network 304. In some embodiments, the terminal network 304 identifies a tag associated with the content object. In some embodiments the tag is identified by parsing a URI of the request. For example, the tag could be a control parameter in the URI of the request for the content object. In some embodiments, the tag could be in a header of an HTTP request and/or response. In some embodiments, the terminal network 304 recognizes a domain name, or sub-domain name, in the URI. For example, the terminal network 304 may have a contract to deliver content objects that have "llnw.com" as the domain name in the URI. If the URI of the content object has "llnw.com," then the terminal network 304 identifies the content object as deliverable by the terminal network 304. In some embodiments, the terminal network 304 references a table identifying that the content object is deliverable by the terminal network 304. For example, the terminal network 304 searches a table for the URI, a portion of the URI, or other identifier. If the terminal network 304 finds the URI, the portion of the URI, or the other identifier on the table, then the terminal network 304 identifies the content object as deliverable. In some embodiments, the table identifying the content object is stored by either the CDN 110 or the terminal network 304. In some embodiments, the terminal network 304 makes an out-of-band request to the CDN 110, asking the CDN 110 whether the content object is deliverable, and in some embodiments, how much the terminal network 304 will be paid for delivering the content object. The CDN 110 replies whether or not the CDN 110 will pay for delivery of the content objects, and in some embodiments, how much the CDN 110 and/or the content provider 108 will pay for the delivery. In some embodiments, the terminal network 304 provides a list of content objects in the terminal-network cache 408 to the CDN 110 and the CDN responds with which content objects the CDN 110 will pay for delivery of and at what rate.

In step 816, the terminal network 304 delivers the content object to the end-user system 102. The terminal network 304 delivers the content object to the end-user system 102 from the terminal-network cache 408. In some embodiments, the terminal network 304 determines playing, or partial playing, of the content object, step 820. The terminal network 304 notifies the CDN 110 of delivery of the content object, step 824. In some embodiments, the terminal network 304 notifies the CDN of deliver, playing, or partial playing, of the content object, step 828. The terminal network 304 receives compensation for delivering the content object from the CDN 110 and/or the content provider 108.

In some embodiments, a terminal network 304 manages the terminal-network cache 408 based on what the terminal network 304 can get compensated for. For example, a terminal network 304 may only cache what the terminal network 304 is going to get paid for delivering. In some embodiments, the terminal network 304 prioritizes content objects in the terminal-network cache 408 based on how much the terminal network 304 can be compensated for delivering the content objects and popularity of the content objects.

Not all steps are required in FIG. 8. For example, in some embodiments step 812 is omitted. The terminal network 304 delivers the content object after determining that the content object is in the terminal-network cache 408, without identifying the content object as deliverable by the terminal network 304.

Figure 9:
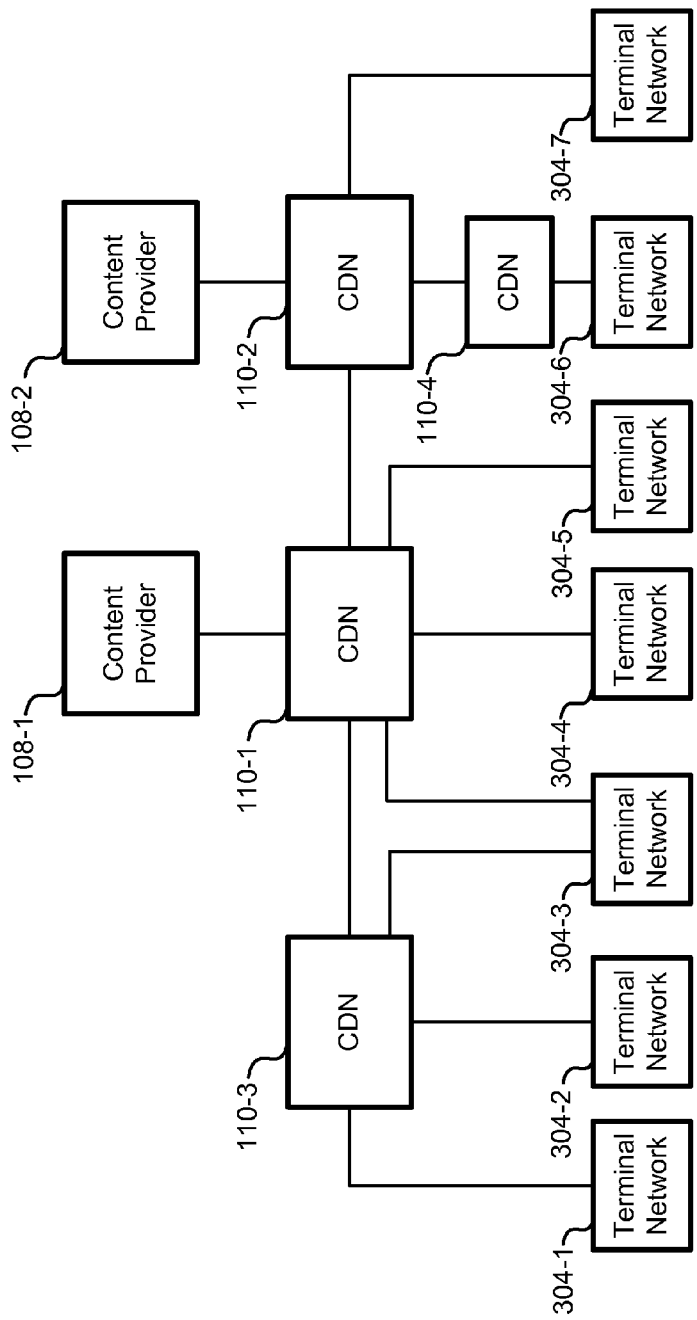
FIG. 9 depicts a block diagram of an embodiment of a hierarchy in a cooperative delivery system.

Referring next to FIG. 9, a block diagram of an embodiment of a hierarchy in a cooperative delivery system is shown. A first content provider 108-1 is connected to a first CDN 110-1. A second content provider 108-2 is connected to a second CDN 110-2. The first CDN 110-1 is connected to both the second CDN 110-2 and a third CDN 110-3. A first terminal network 304-1 through a seventh terminal network 304-7 are shown. The first terminal network 304-1, a second terminal network 304-2, and a third terminal network 304-3 are connected to the third CDN 110-3. The third terminal network 304-3, a fourth terminal network 304-4, and a fifth terminal network 304-5 are connected to the first CDN 110-1. A sixth terminal network 304-6 is connected to a fourth CDN 110-4, and the fourth CDN 110-4 is connected to the second CDN 110-2. The seventh terminal network 304-7 is connected to the second CDN 110-2. In some embodiments, each terminal network 304 comprises a terminal-network cache 408.

Though theoretically any terminal network 304 can connect through the Internet 104 to any CDN 110, the embodiment in FIG. 9 displays connections based on geography and/or network closeness. For example, the third CDN 110-3 has POPs primarily located in South America. The first CDN 110-1 has POPs primarily located in the United States. The first terminal network 304-1 and the second terminal network 304-2 operate primarily in South America. The third terminal network 304-3 operates primarily in Central America. The fourth terminal network 304-4 and the fifth terminal network 304-5 operate primarily in the United States. The second CDN 110-2 has POPs primarily in Europe. The seventh terminal network 304-7 operates primarily in Europe. The fourth CDN 110-4 has POPs primarily in the Middle East, and the sixth terminal network 304-6 operates primarily in the Middle East.

The first CDN 110-1, the second CDN 110-2, and the third CDN 110-4 share in delivering content requests using aggregation system 604 that is part of the first CDN 110-1. The second CDN 110-2 and the fourth CDN 110-4 are part of a second cooperative delivery system, where the fourth CDN 110-4 subcontracts to the second CDN 110-2 for delivering content to end-user systems 102 in the Middle East. In some embodiments, the second CDN 110-2 comprises a second aggregation system 604 for managing shared content delivery in the second cooperative delivery system between the second CDN 110-2 and the fourth CDN 110-4.

As an example of the embodiment of the cooperative delivery system functioning, the first content provider 108-1 contracts with the first CDN 110-1 to distribute a first content object. The second content provider 108-2 contracts with the second CDN 110-2 to distribute a second content object. When an end-user system 102, which receives Internet 104 service through the first terminal network 304-1, initiates a first request for the first content object, the first CDN 110-1 receives the first request for the first content object. The aggregation system 604, as part of the first CDN 110-1, assignees delivery of the first content object to the third CDN 110-3 based on geography coverage for the third CDN 110-3. In some embodiments, the first CDN 110-1 considers other factors in assigning delivery of the first content object to the third CDN 110-3.

When an end-user system 102 that receives Internet 104 service through the first terminal network 304-1 initiates a first request for the second content object, the first request for the second content object is received by the second CDN 110-2. The second CDN 110-2 determines that the first request for the second content object is not within Europe or the Middle, but from South America. Based on determining that the first request for the second content object originated from outside Europe and the Middle East, the second CDN 110-2 forwards the first request for the second content object to the aggregation system 604, which is part of the first CDN 110-1. The first CDN 110-1 assigns the first request for the second content object to the third CDN 110-3. If the third CDN 110-3 does not already have a copy of the second content object cached, the third CDN 110-3 requests the second content object from the aggregation system 604. If the aggregation system 604 does not have the second content object cached in a content cache 508, the aggregation system 604 requests the second content object from the second CDN 110-2, similarly as a mediator system 308 requests a content object from a content provider 108. The third CDN 110-3 responds to the first request for the second content object. Control parameters are passed between the CDNs 110 and terminal networks 304 as disclosed in this application.

When an end-user system 102 that receives Internet 104 service from the sixth terminal network 304-6 initiates a second request for the first content object, the second request for the first content object is routed to the first CDN 110-1. The aggregation system 604 assigns the second CDN 110-2 the second request for the first content object. With or without informing the first CDN 110-1, the second CDN 110-2 assigns the fourth CDN 110-4 the second request for the first content object. In some embodiments, the second CDN 110-2 passes control parameters from the second CDN 110-2 to the fourth CDN 110-4. In some embodiments, a control parameter received by the second CDN 110-2 prevents the second CDN 110-2 from assigning the second request for the first content object to the fourth CDN 110-4. For example, some control parameters restrict delivery of a content object from being assigned to CDNs 110 outside a given cooperative delivery system. Some control parameters state which CDNs 110 of a cooperative delivery system can deliver a content object. For example, the first content provider 108-1 may express that the first content object may only be delivered by the first CDN 110-1 and the third CDN 110-3. The first content provider 108-1 could specify that only networks 504 that ensure a certain level of security can be assigned to deliver the first content object. The first content provider 108-1 could specify that only networks 504 that ensure a certain level of quality of service or performance to end-user systems 102 can be assigned to deliver the first content object. The first content provider 108-1 may prohibit subcontracting outside of a cooperative delivery system, which would prevent the second CDN 110-2 from assigning the second request for the first content object to the fourth CDN 110-4.

When an end-user system 102 that receives Internet 104 service from the third terminal network 304-3 initiates a third request for the first content object, the first CDN 110-1 could choose to deliver the first content object or assign the third CDN 110-3 the third request for the first content object. The first CDN 110-1 may choose to assign requests for the first content object to the second CDN 110-2 or the third CDN 110-3 for various reasons, including situations where the first CDN 110-1 is near or at capacity.

When an end-user system 102 that receives Internet 104 service from the third terminal network 304-3 initiates a second request for the second content object, the second request for the second content object is routed to the second CDN 110-2. The second request for the second content object is passed to the first CDN 110-1. The first CDN 110-1 either assigns the first CDN 110-1 or the third CDN 110-3 to respond to the second request for the second content object. In some situations, the first CDN 110-1 may assign the third CDN 110-3 to deliver the second content object to the sixth terminal network 304-6 and/or the seventh terminal network 304-7, such as if network traffic used by the second CDN 110-2 become congested beyond a certain threshold.

In some embodiments, a content provider 108 or a CDN 110 requests another CDN 110 and/or a terminal network 304 to purge a content object from a cache. For example, the first CDN 110-1 sends a request to the third terminal network 304-3 to purge the first content object from a terminal-network cache 408 of the third terminal network 304-3. The third terminal network 304-3 purges the content object from the terminal-network cache 408 of the third terminal network 304-3. A request to purge a content object from a terminal-network cache 408 can be sent out of band. For example, a direct request can be sent from a CDN 110 to another CDN 110, or from a CDN 110 to a terminal network 304, without involving an end-user system 102 requesting the content object.

In some embodiments, a request to purge a content object from a terminal-network cache 408 is sent in response to another request routed through a network 504. For example, the first content provider 108-1 wishes to replace a first version of the first content object with a second version of the first content object. The analytics engine 532 of the aggregation system 604 has a record that the third terminal network 304-3 should have the first version of the content object cached. The record that the third terminal network 304-3 should have the first content object cached could be because the first CDN 110-1 passed control parameters to the third terminal network 304-3 specifying a caching duration when responding to the third request for the first content object. When the first CDN 110-1 receives a third request for the second content object, where a response to the third request for the second content object is routed through the third terminal network 304-3, the first CDN 110-1 inserts a control parameter in a request URI for the third terminal network 304-3 to delete the first content object from a cache of the third terminal network 304-3. If another request came from the third terminal network 304-3 for the first content object, an instruction to purge the first version of the first content object from a cache could be included in a response to the another request for the first content object. Additionally, the second version of the first content object could be provided.

Figure 10:
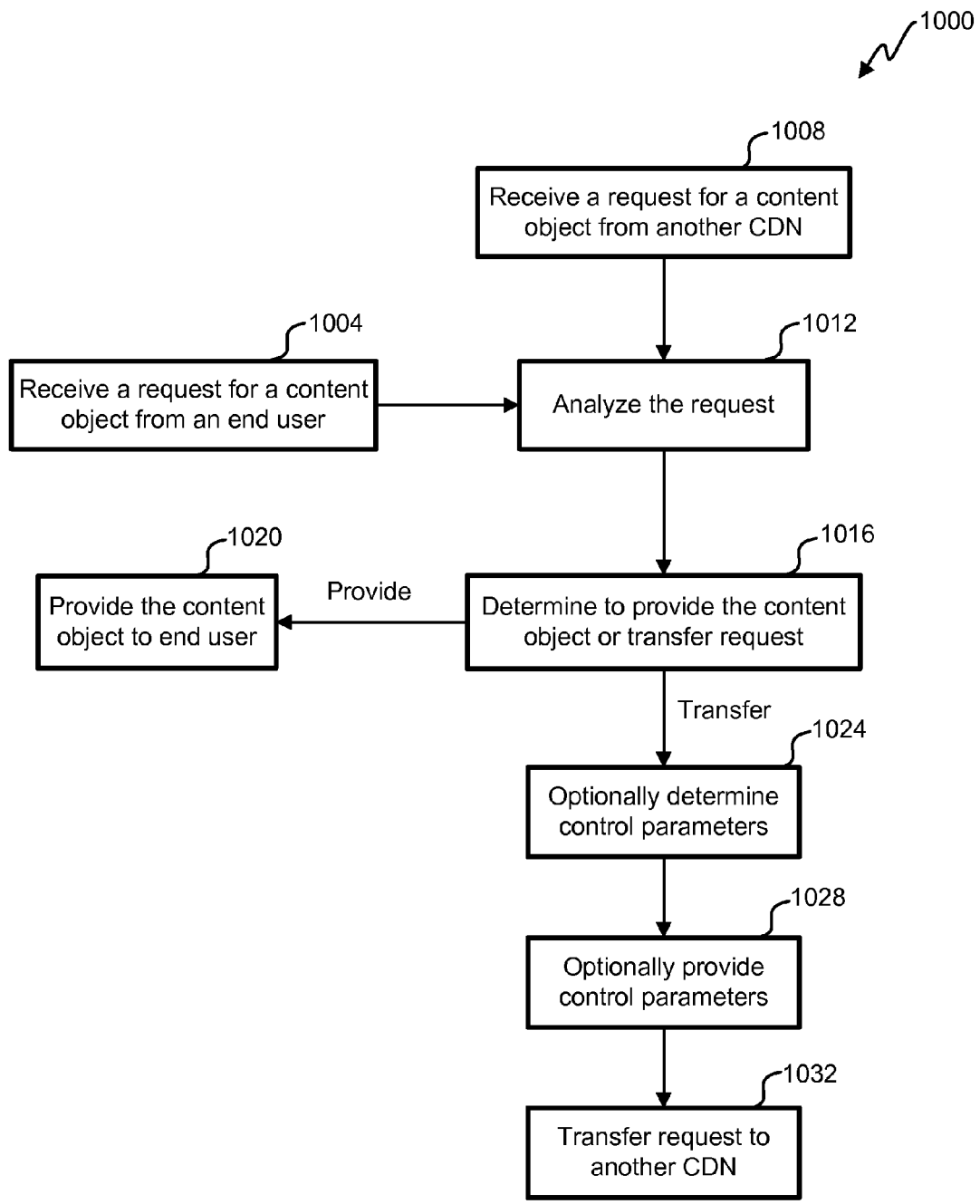
FIG. 10 illustrates a flowchart of an embodiment of a method for delivering content objects using a cooperative delivery system.

Referring next to FIG. 10, a flowchart of an embodiment of a method 1000 of delivering content objects using a cooperative delivery system is shown. An aggregation system 604 is part of a first CDN 110-1. The process begins in either step 1004 or step 1008. In step 1004 the aggregation system 604 at a first CDN 110-1 receives a request for a content object from an end-user system 102. In step 1008, the aggregation system 604 receives a request for the content object from a second CDN 110-2.

The aggregation system 604 analyzes the request for the content object (the request from either the end-user system 102 or the second CDN 110-2) in step 1012. In some embodiments, the aggregation system 604 analyzes the request by analyzing a URI of the request for control parameters, such as for control parameters inserted by a terminal network 304 that identify the terminal network 304 that provides Internet 104 service for the end-user system 102. In some embodiments, the aggregation system 604 reads headers and/or a delivery IP address to estimate a location of the end-user system 102.

In step 1016, the aggregation system 604 determines whether to have the first CDN 110-1 provide the content object or to transfer the request for the content object to another CDN 110 or terminal network 304. An assignment engine 516, as discussed previously, may be used to determine whether to provide the content object or transfer the request. For example, a decision to transfer the request could be based on another network 504 having a lower latency connection to the end-user system 102; the latency between the first CDN 110-1 and the end-user system 102 crossing a threshold value; and/or the delivery cost being higher for the first CDN 110-1 than the another network 504.

If a determination is made for the first CDN 110-1 to provide the content object, the first CDN 110-1 provides the content object to the end-user system 102. If a determination is made for the first CDN 110-1 to transfer the request to another CDN 110 or terminal network 304, the first CDN 110-1 optionally determines control parameters to include in transferring the request, step 1024. In step 1028, the first CDN 110-1 optionally provides control parameters when transferring the request. In step 1032, the request for the content object is transferred to the another CDN 110 or another terminal network 304.

In some embodiments, transferring the request to the another CDN 110 or terminal network 304 includes receiving a delivery report from the another CDN 110 or terminal network 304. The first CDN 110-1 pays the another CDN 110 or terminal network 304 for delivery of the content object. In some embodiments the first CDN 110-1 reports delivery of the content object to the second CDN 110-2, and the first CDN 110-1 receives compensation from the second CDN 110-2 for delivery of the content object.

In some embodiments, the terminal network 304 passes control parameters upstream to the CDN 110 and/or content provider 108. The control parameters identify end-user system 102 characteristics such as geographic location, device type, end-user profile information, metadata about network connections and speed, and/or true client IP address. The CDN 110 and/or content originator use the control parameters received from the terminal network 304 to modify what an end-user system 102 receives. For example, take a young man playing a video game that is graphics intensive on a smart phone in a first house with a first Wi-Fi connection. The video game is provided by the first content provider 108-1. The first Wi-Fi connection has Internet 104 service provided by the fourth terminal network 304-4. The young man leaves the first house to walk to a second house where a friend of the young man lives. As the young man leaves the first house, the first Wi-Fi signal weakens and the smart phone switches to a service provided by a mobile network operator. In this example, the mobile network operator is the fifth terminal network 304-5. The service provided by the mobile network operator has less bandwidth than the first Wi-Fi connection. The mobile network operator sends control parameters to the first content provider 108-1. The first content provider 108-1 determines to provide a less graphic-intensive rendering of the video game based on control parameters received from the fifth terminal network 304-5 showing a lower bandwidth connection is available to the end-user system 102. When the young man arrives at the second house, the smart phone establishes a connection with a second Wi-Fi signal. The second Wi-Fi connection has Internet 104 service provided by an eighth terminal network. The eight terminal network is different from the fourth terminal network 304-4 and the fifth terminal network 304-5. The eighth terminal network sends control parameters to the first content provider 108-1. The content provider 108-1 identifies a higher bandwidth connection to the end-user system 102 based on the control parameters received from the eighth terminal network and resumes providing the end-user system 102 with a graphic-intensive rendering of the video game. In some embodiments, control parameters are passed to the mobile network operator for the mobile network operator to modify a policy to provide the smart phone of the young man with more bandwidth when the young man is walking to the second house.

Figure 11:
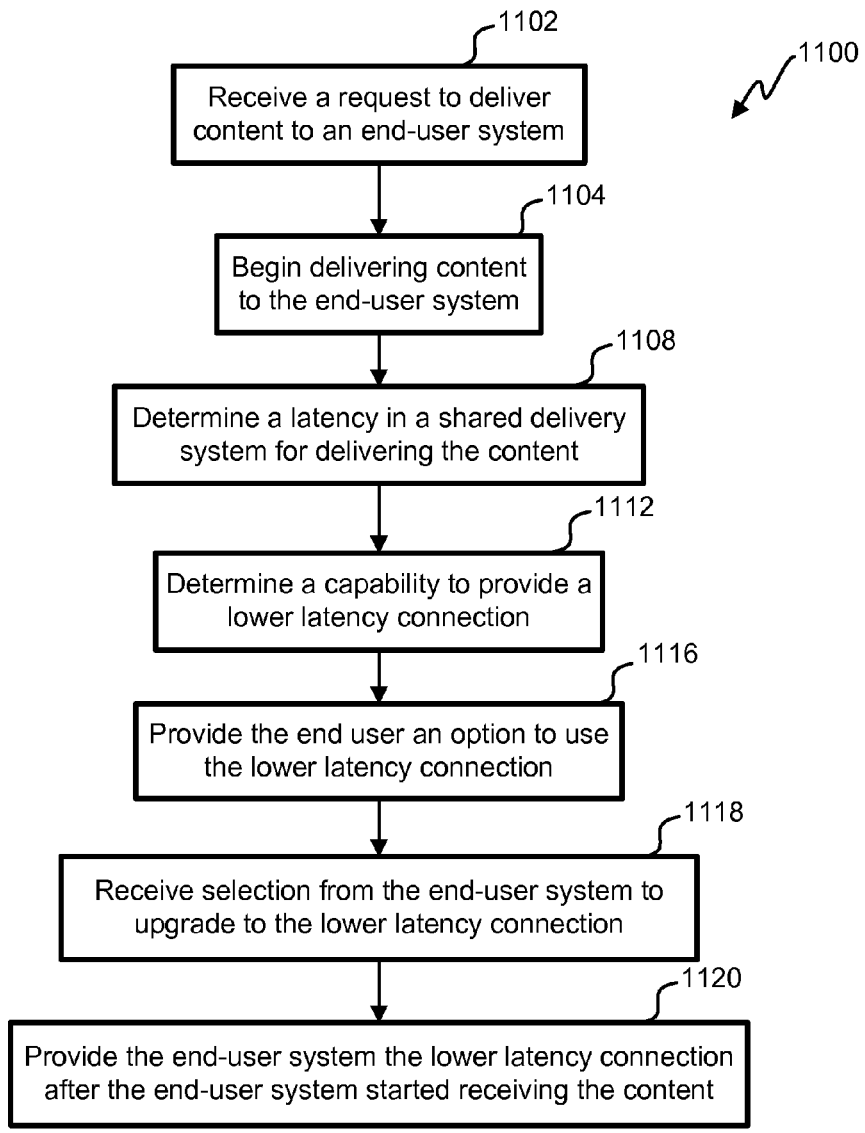
FIG. 11 illustrates a flowchart of an embodiment of a method for dynamically improving a user's experience in a cooperative delivery system.

Referring next to FIG. 11, a flowchart of an embodiment of a method 1100 for dynamically improving a user's experience in a cooperative delivery system is shown. The method 1100 begins in step 1104 where the cooperative delivery system receives a request for content made available over the Internet 104 from an end-user system 102. In some embodiments, the end-user system 102 is computer system, smart phone, video player, browser, set-top box, or some API that triggers the request. In some embodiments, the content is a movie or a game, such as a browser-based multiplayer online game. The cooperative delivery system comprises a CDN 110 and a terminal network 304. The CDN 110 is managed by a first entity. The terminal network 304 is managed by a second entity. The first entity is different from the second entity. The terminal network 304 provides Internet 104 service to the end-user system 102.

In step 1104, the cooperative delivery system begins delivering the content over the Internet 104 to the end-user system 102. In some embodiments, the cooperative delivery system uses control parameters to pass a minimum quality of service and/or latency requirements. In step 1108, the cooperative delivery system determines the end-user's experience on the Internet 104 is likely being limited by latency in a cooperative delivery system. In some embodiments, determining the end-user's experience is likely being limited is performed by an aggregation system 604 receiving one or more reports on performance of the network(s) 504 and/or end-user systems 102. The aggregation system 604 then compares the performance of the networks 504 to optimal performance for the content. In some embodiments, the analytics engine 532 probes performance of the networks 504. In some embodiments, network performance is measured by an end-user system 102 beaconing back performance data to the CDN 110. In some embodiments, it may be acceptable to a content provider 108, or the content provider 108 may have contracted with the CDN 110, for the cooperative delivery system to provide the content at a lower than optimal performance.

In step 1112, the cooperative delivery system determines the cooperative delivery system is capable of providing the end-user system 102 a lower latency connection for delivering the content to the end-user system 102. In one example, the CDN 110 could use different resources, such as a server with a faster processor, a different type of or faster hard drive, and/or more memory. In another example, the CDN 110 could determine to use a dedicated connection, or a connection with a larger TCP send and/or receive window. In another example, the cooperative delivery network implements an acceleration technique, such front-end acceleration either using just CDN 110 resources or a combination of a resource of the CDN 110 and a resource of another network 504. In a further example, the cooperative delivery system could use a higher bandwidth connection between the networks. As another example, the terminal network 304 could increase bandwidth available to the end-user system 102. Another example includes serving the content from a POP closer, in a network sense, to the end-user system 102. Another example includes selecting a second CDN 110-2 to deliver the content. A first CDN 110-1 may be cheaper, but the second CDN may be better performing because the second CDN 110-2 has POPs 120 closer to the end-user system 102.

In step 1116, the cooperative delivery system provides an option to the end-user system 102 to upgrade to the lower latency connection. In some embodiments, a manifest is modified so that a packet is inserted that presents the end user 128 an option to upgrade. In some embodiments, content of a data-packet container is modified. In some embodiments, the end user 128 is presented with a pop-up window. The pop-up window provides the end user 128 a selection of one or more options for better performance, and in some embodiments, price options. In some embodiments, the cooperative delivery system provides an option to the end user 128 through an application interface. In some embodiments, the CDN 110 notifies the content provider 108 and the content provider 108 provides the option to the end user 128 to upgrade. For example, an end user 128 playing a browser-based, first-person shooter game becomes frustrated because of latency in the cooperative delivery system. In a gaming interface for the first-person shooter game, the end user 128 is presented with a button to upgrade to a better service. A CDN 110 hosting the first-person shooter game would receive the request for the upgrade to better service (either from the end user 128 or the content provider 108) and forwards the request for the upgrade, as appropriate, to networks 504 (e.g., using control parameters) that are part of a chain in delivering the content to the end-user system 102. In some embodiments, the content is delivered in chunks and a message chunk is sent to the end-user system 102, effectively pausing delivery of the content. For example, an end user 128 is watching a movie at home. The movie is stopped and the end user 128 is presented with an option to pay for a better connection or for a higher quality version of the movie. Or in another example, the end user 128 may be presented the option to watch the movie in HD instead of standard definition. In some embodiments, the option to upgrade is delayed for a period of time. For example, the end user 128 is not presented with the option to upgrade until the end-user system 102 has played at least 10, 15, 20, 30, 45, or 60 seconds of the movie.

In step 1118, the cooperative delivery system receives a selection from the end-user system 102 to upgrade to the lower latency connection. In some embodiments, a CDN 110 providing the content receives the selection to upgrade. In some embodiments, the content provider 108 receives the selection to upgrade. For example, in the first-person shooter game example above, the content originator receives the selection to upgrade and also receives payment from the end user 128. The content provider 108 then pays the CDN 110. In some embodiments, a mediator system 308 receives the selection to upgrade and payment from the end user 128. In some embodiments, the terminal network 304 receives the selection to upgrade. Payment for the upgrade may or may not be collected by the same entity that receives the selection to upgrade.

In step 1120, the cooperative delivery system provides the end-user system 102 the lower latency connection after the end-user system 102 started receiving the content. In some embodiments, the CDN 110 makes changes such as using a server with a faster processor or using different protocols such as split TCP. In some embodiments, the end-user system 102 is given a different URL to request the content. For example, for a HD version of the movie, the end-user system 102 is redirected to request the movie from a different URL. In some embodiments, a different network 504 is selected to deliver the content.

In some embodiments, the cooperative delivery system provides the end user the option to use the lower latency connection before starting to deliver the content. The cooperative delivery system tests and/or predicts latency and/or quality of the connection between the end-user system 102 and a content source. In some embodiments, the terminal network 304 passes control parameters to the CDN 110 in the form of a modified URI. The control parameters disclose end-user system 102 characteristics such as geographic location, device type, end-user profile information, metadata about network connections and speed, information about contracted bandwidth by the end user 128, current bandwidth usage by the end-user system 102, and/or true client IP address. Based on the end-user system 102 characteristics, the cooperative delivery system predicts the experience of the end user 128 will be limited in some way. In response, the cooperative delivery system can notify the end user 128 before delivering the content. For example, the cooperative delivery system determines that the cooperative delivery system can provide a high definition version of the content and provides the option to upgrade service before download of the content begins. In another example, the cooperative delivery system may identify the end-user system 102 is not likely capable of displaying a movie in high definition; if the end-user system 102 requested a high definition version of the content, the cooperative delivery system provides the end user 128 an option to downgrade to a lower resolution, but less expensive, version of the content. In some embodiments, the cooperative delivery system pings the end-user system 102 to determine a latency and/or connection quality. In some embodiments, the cooperative delivery system predicts latency based on historical data.

Figure 12:
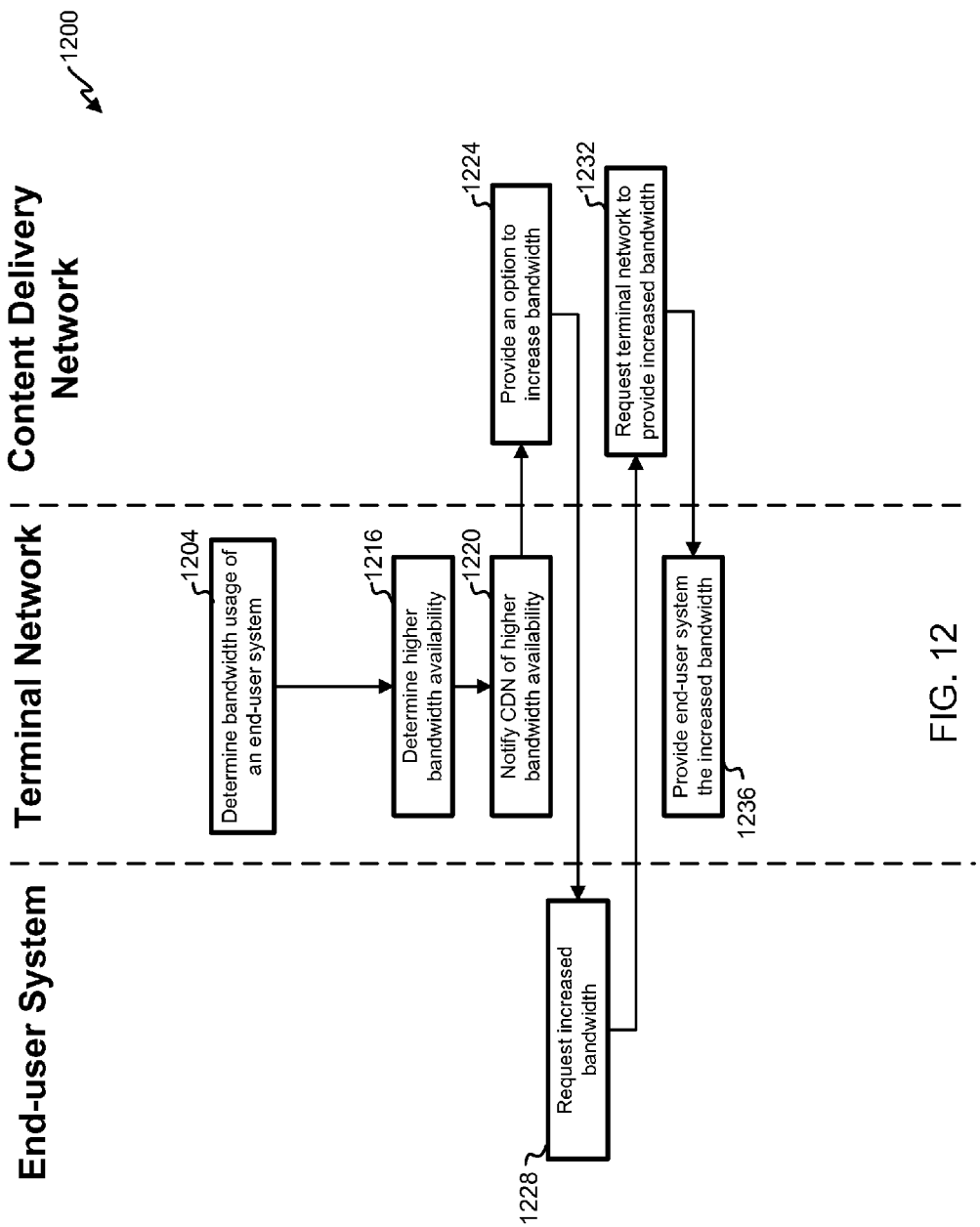
FIG. 12 illustrates a swim diagram of an embodiment of a method for dynamically allocating bandwidth in a cooperative delivery system.

Referring next to FIG. 12, a swim diagram of an embodiment of a method 1200 for dynamically allocating bandwidth in a cooperative delivery system is illustrated. The swim diagram begins in block 1204 with a terminal network 304 determining a bandwidth usage of an end-user system 102. In some embodiments, bandwidth is determined similarly to determining latency in step 1104 above. In some embodiments, the terminal network 304 monitors bandwidth usage of the end-user system 102 for the bandwidth usage to exceed a bandwidth threshold. In some embodiments, the bandwidth threshold is a percentage of a contracted bandwidth by the end user 128. For example, an end user 128 contracts with the terminal network 304 for Internet 104 usage in her home for a bandwidth up to 5 Mbps. When the end-user system 102 uses more than 4 Mbps in a given time frame, such as exceeding the 4 Mbps for twenty seconds, the cooperative delivery system marks the end-user system 102. The 4 Mbps being an 80% bandwidth threshold of the contracted 5 Mbps. In some embodiments, the bandwidth threshold is 85%, 90%, 95%, 99%, 100%, or 105% of the contracted bandwidth. The 105% including a buffer bandwidth the terminal network 304 provides as a service to the end user 128 or as a service contracted by a CDN 110 and/or content provider 108.

In block 1216, the terminal network 304 determines whether the terminal network 5504 can provide the end-user system 102 with a higher bandwidth connection. In some embodiments, techniques similar to those used in step 1112 are used to determine whether a faster connection can be provided. In some embodiments, the terminal network 304 queries a data store for information on whether Internet 104 service to the end-user system 102 is being throttled. For example, the end-user system 102 may already have a contract for a fastest internet speed a terminal network 304 provides.

In block 1220, the terminal network 304 sends a notification to the CDN 110 informing the CDN 110 that the terminal network 304 has capacity to provide the end-user system 102 a higher bandwidth connection. In some embodiments, the terminal network sends a notification to the mediator system 308 and/or the content provider 108 that the terminal network 304 has the capacity to provide the higher bandwidth. In some embodiments, the notification identifies the end-user system 102, the content object, the terminal network 304, and/or the end user 128. In some embodiments, the end-user system is identified by an IP address, cookie ID, and/or session ID. In some embodiments, the notification includes more than one bandwidth option available. In some embodiments, the notification includes a cost, or costs, associated with an increase in bandwidth. In one example, the costs are what the CDN 110 serving the content will be charged. In some embodiments, the terminal network 304 provides increased bandwidth and charges the end user 128 on a next billing cycle. The terminal network 304 would then pay the CDN 110 delivering the content and/or the mediator system 308 for coordinating providing an end user 128 an option to an increased bandwidth.

In block 1224, the CDN 110 delivering the content object provides the end user 128 an option to increase bandwidth. In some embodiments, the CDN 110 delivering the content object provides the end user 128 options similarly as step 1116 in FIG. 11 described previously. For example, the option could be presented as an option in the application layer by the content provider 108. As another example, the option to increase bandwidth could be presented in a browser-based video player. In some embodiments, before the CDN 110 delivering the content object provides the end user 128 the option to increase bandwidth, the CDN 110 and/or mediator system 308 determines whether there would be a bottleneck in the cooperative delivery system mitigating a benefit of the increased bandwidth. In some embodiments, the option of the increased bandwidth is equal to the higher bandwidth determined by the terminal network 304. In some embodiments, the option to increase bandwidth provides more than one bandwidth option. In some embodiments, cost, or costs, are provided to the end user 128 for increasing the bandwidth. For example, the end user 128 could be presented with an option to increase Internet 104 access bandwidth from 5 Mbps (the current contracted rate) to 10 Mbps for one hour for $1.50, to 10 Mbps for two hours for $1.99, and to 20 Mbps for two hours for $2.50.

In block 1228, the end-user system 102 makes a request for increased bandwidth. In some embodiments, the CDN 110 receives the request and notifies the terminal network 304 to provide the higher bandwidth, block 1232. In some embodiments, the request for higher bandwidth is routed directly to the terminal network 304. The terminal network 304 then provides the end-user system 102 with the increased bandwidth, step 1236. In some embodiments, the end-user system 102 is provided the higher bandwidth connection while receiving the content object. For example, an end user 128 playing a first-person shooter game (after getting "killed" several times and blaming her slow Internet 104 connection), would be provided the increased bandwidth while playing the first person shooter game.

In some embodiments, the CDN 110 providing the content object, and/or the mediator system 308, receives payment for the increased bandwidth. The terminal network 304 reports to the CDN 110, and/or the mediator system 308, that that the terminal network 304 provided the increased bandwidth. The CDN 110, and/or the mediator system 308, compensate the terminal network 304 for providing the increased bandwidth. In some embodiments, the payment from the end user 128 is sent to the content provider 108 and from the content provider 108 to the terminal network 304, the CDN 110, and/or the mediator system 308.

In some embodiments, the terminal network 304 predicts a bandwidth limitation. For example, three household members are watching movies. A fourth household member requests a fourth movie. The cooperative delivery system, either at the terminal network 304, the CDN 110, or the mediator system 308 detects that the fourth movie, combined with current bandwidth usage, would exceed a bandwidth that is currently available to the household. Before the fourth movie is started, the CDN 110 inserts a pop-up window explaining the situation and an option for the fourth household member to purchase more bandwidth.

In some embodiments, instead of determining a bandwidth usage of an end-user system 102, as discussed in block 1204, CDN 110 determines that an end-user system 102 is not receiving a contracted class of service. For example, an end user 128 could be at a bus stop. A cell tower operated by a terminal network 304 at the bus stop is oversubscribed in aggregate for a plurality of users at the bus stop, yet not one user is oversubscribed. The CDN 110 sends a quality of service, or quality of experience, standard for the terminal network 304 to enforce. The terminal network 304 prioritizes bandwidth allocated to the end user 128, such as by increasing a class of service to the end user 128 at the expense of other user at the bus stop, so that the end user 128 receives better performance. In another example, a content provider, such as the National Football League (NFL), reserves a percentage of bandwidth of the terminal network 304. When the end user 128 requests an NFL video, the end user 128 is given an option to upgrade to a higher class of service (similar to block 1224). When the end user 128 requests the higher class of service, terminal network 304 allocates a portion of the reserved bandwidth for the end user 128 watching the NFL video.

A number of variations and modifications of the disclosed embodiments can also be used. For example, joint security offerings can be provided in a cooperative delivery system across several different networks. Additionally, joint dynamic-site acceleration between CDNs 110 and/or terminal networks 304 can also be provided. For example, a control parameter can be passed from a CDN 110 to a terminal network 304, where the control parameter specifies an acceleration technique that the CDN 110 is implementing and/or an acceleration technique for the terminal network 304 to implement. In some variations, delivery of objects over cooperative networks is improved by one or more techniques of caching, network acceleration, and/or content transformation. In some embodiments, the second CDN 110-2 requests to use resources of the first CDN 110-1. For example, the first CDN 110-1 could provide resources to transcode a content object for the second CDN 110-2. As another example, the first CDN 110-1 provides a resource for the second CDN 110-2 that has a capability to apply an acceleration technique or use a protocol (such as TCP fast open).

Further, an aggregation system 604 can be substituted for a mediator system 308 in embodiments, and in some embodiments the mediator system 308 is substituted for the aggregation system 604. Many of the functions of the mediator system 308 and aggregation system 605, particularly those described in conjunction with FIGS. 5-12, can be implemented between two networks 504. For example, a CDN 110 and another CDN 110, or a CDN 110 and a terminal network 304, can pass control parameters to each other as described previously.

Figure 13:
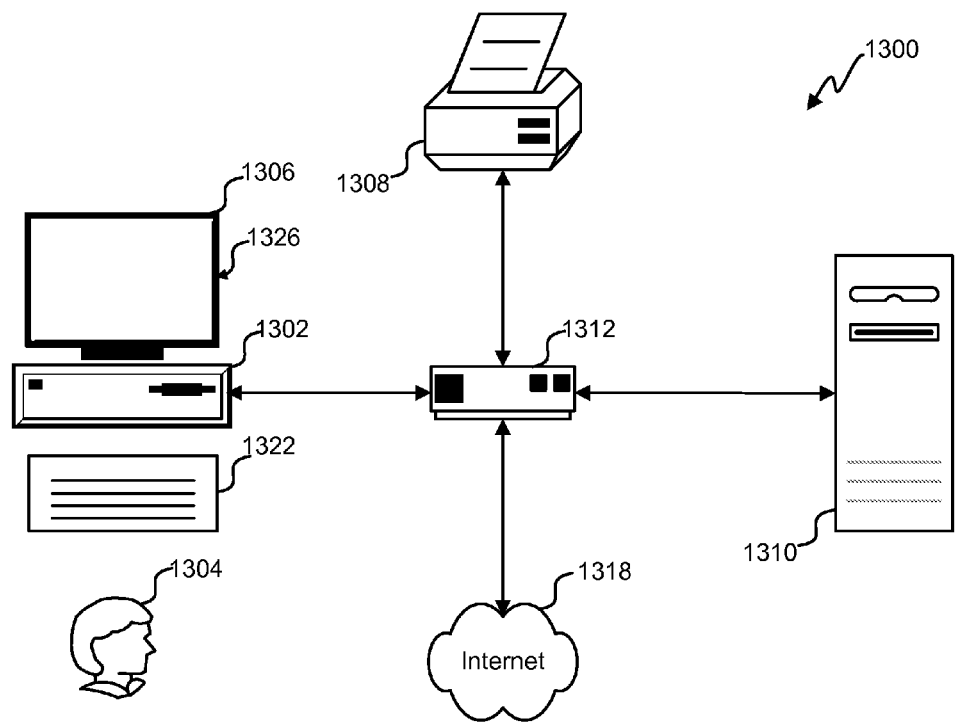
FIG. 13 depicts a block diagram of an embodiment of a computer system.

Referring next to FIG. 13, an exemplary environment with which embodiments may be implemented is shown with a computer system 1300 that can be used by a designer 1304 to design, for example, electronic designs. The computer system 1300 can include a computer 1302, keyboard 1322, a network router 1312, a printer 1308, and a monitor 1306. The monitor 1306, processor 1302 and keyboard 1322 are part of a computer system 1326, which can be a laptop computer, desktop computer, handheld computer, mainframe computer, etc. The monitor 1306 can be a CRT, flat screen, etc.

A designer 1304 can input commands into the computer 1302 using various input devices, such as a mouse, keyboard 1322, track ball, touch screen, etc. If the computer system 1300 comprises a mainframe, a designer 1304 can access the computer 1302 using, for example, a terminal or terminal interface. Additionally, the computer system 1326 may be connected to a printer 1308 and a server 1310 using a network router 1312, which may connect to the Internet 1318 or a WAN.

The server 1310 may, for example, be used to store additional software programs and data. In one embodiment, software implementing the systems and methods described herein can be stored on a storage medium in the server 1310. Thus, the software can be run from the storage medium in the server 1310. In another embodiment, software implementing the systems and methods described herein can be stored on a storage medium in the computer 1302. Thus, the software can be run from the storage medium in the computer system 1326. Therefore, in this embodiment, the software can be used whether or not computer 1302 is connected to network router 1312. Printer 1308 may be connected directly to computer 1302, in which case, the computer system 1326 can print whether or not it is connected to network router 1312.

Figure 14:
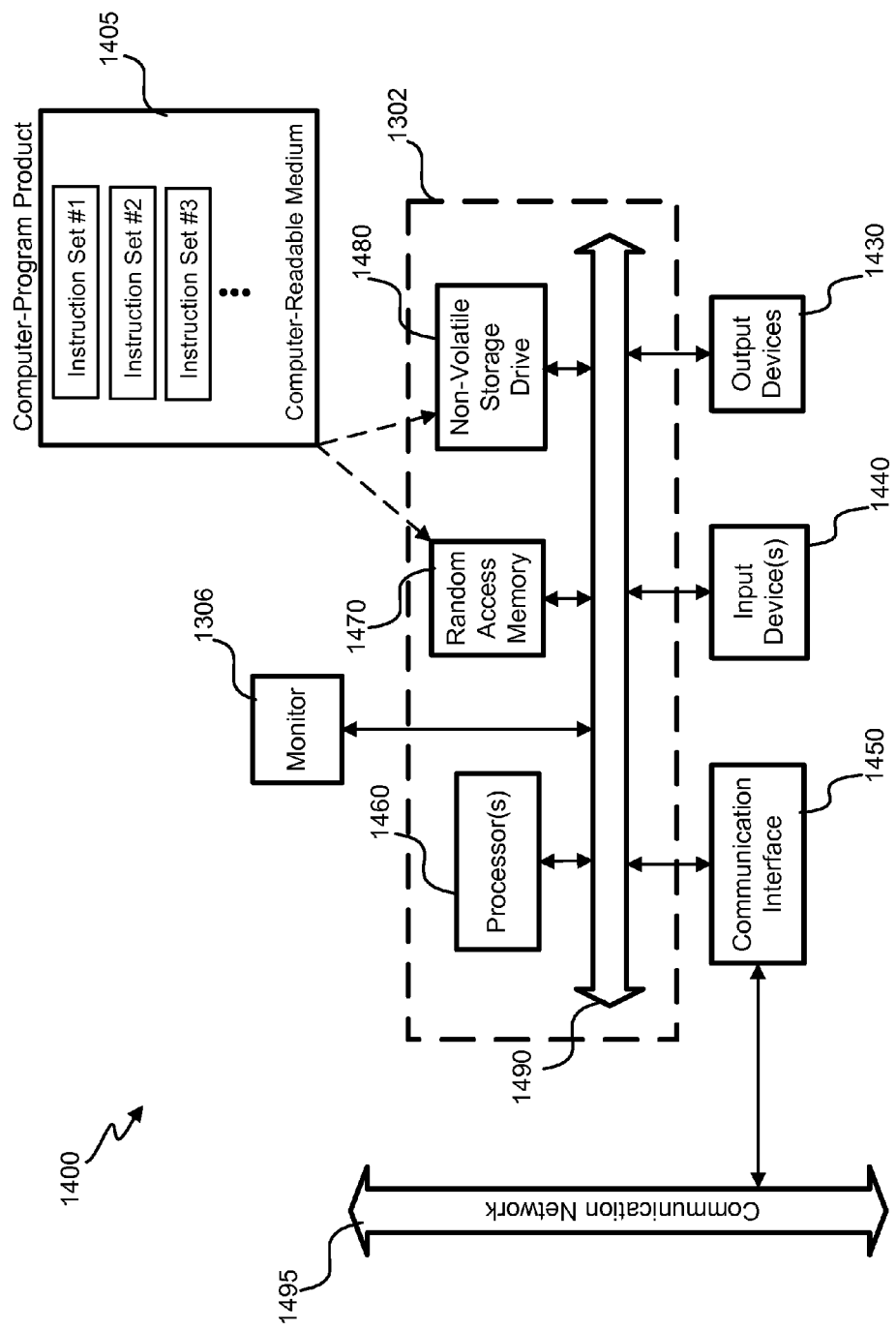
FIG. 14 depicts a block diagram of an embodiment of a special-purpose computer system.

With reference to FIG. 14, an embodiment of a special-purpose computer system 1400 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1326, it is transformed into the special-purpose computer system 1400.

Special-purpose computer system 1400 comprises a computer 1302, a monitor 1306 coupled to computer 1302, one or more additional user output devices 1430 (optional) coupled to computer 1302, one or more user input devices 1440 (e.g., keyboard, mouse, track ball, touch screen) coupled to computer 1302, an optional communications interface 1450 coupled to computer 1302, a computer-program product 1405 stored in a tangible computer-readable memory in computer 1302. Computer-program product 1405 directs system 1400 to perform the above-described methods. Computer 1302 may include one or more processors 1460 that communicate with a number of peripheral devices via a bus subsystem 1490. These peripheral devices may include user output device(s) 1430, user input device(s) 1440, communications interface 1450, and a storage subsystem, such as random access memory (RAM) 1470 and non-volatile storage drive

1480 (e.g., disk drive, optical drive, solid state drive), which are forms of tangible computer-readable memory.

Computer-program product 1405 may be stored in non-volatile storage drive 1480 or another computer-readable medium accessible to computer 1302 and loaded into memory 1470. Each processor 1460 may comprise a microprocessor, such as a microprocessor from Intel® or Advanced Micro Devices, Inc.®, or the like. To support computer-program product 1405, the computer 1302 runs an operating system that handles the communications of product 1405 with the above-noted components, as well as the communications between the above-noted components in support of the computer-program product 1405. Exemplary operating systems include Windows® or the like from Microsoft Corporation, Solaris® from Sun Microsystems, LINUX, UNIX, and the like.

User input devices 1440 include all possible types of devices and mechanisms to input information to computer system 1302. These may include a keyboard, a keypad, a mouse, a scanner, a digital drawing pad, a touch screen incorporated into the display, audio input devices such as voice recognition systems, microphones, and other types of input devices. In various embodiments, user input devices 1440 are typically embodied as a computer mouse, a trackball, a track pad, a joystick, wireless remote, a drawing tablet, a voice command system. User input devices 1440 typically allow a user to select objects, icons, text and the like that appear on the monitor 1306 via a command such as a click of a button or the like. User output devices 1430 include all possible types of devices and mechanisms to output information from computer 1302. These may include a display (e.g., monitor 1306), printers, non-visual displays such as audio output devices, etc.

Communications interface 1450 provides an interface to other communication networks and devices and may serve as an interface to receive data from and transmit data to other systems, WANs and/or the Internet 1318. Embodiments of communications interface 1450 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1450 may be coupled to a computer network, to a FireWire® bus, or the like. In other embodiments, communications interface 1450 may be physically integrated on the motherboard of computer 1302, and/or may be a software program, or the like.

RAM 1470 and non-volatile storage drive 1480 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1470 and non-volatile storage drive 1480 may be configured to store the basic programming and data constructs that provide the functionality of various embodiments of the present invention, as described above.

Software instruction sets that provide the functionality of the present invention may be stored in RAM 1470 and non-volatile storage drive 1480. These instruction sets or code may be executed by the processor(s) 1460. RAM 1470 and non-volatile storage drive 1480 may also provide a repository to store data and data structures used in accordance with the present invention. RAM 1470 and non-volatile storage drive 1480 may include a number of memories including a main random access memory (RAM) to store of instructions and data during program execution and a read-only memory (ROM) in which fixed instructions are stored. RAM 1470 and non-volatile storage drive 1480 may include a file storage subsystem providing persistent (non-volatile) storage of program and/or data files. RAM 1470 and non-volatile storage drive 1480 may also include removable storage systems, such as removable flash memory.

Bus subsystem 1490 provides a mechanism to allow the various components and subsystems of computer 1302 communicate with each other as intended. Although bus subsystem 1490 is shown schematically as a single bus, alternative embodiments of the bus subsystem may utilize multiple busses or communication paths within the computer 1302.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that include or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for controlling delivery of a content object over the Internet using a cooperative delivery system, the system comprising:
   a rules repository having a plurality of control parameters, wherein the plurality of control parameters relate to delivery or caching of content objects;
   a content delivery network configured to:
     receive a request for the content object from an end-user system;
     receive from the rules repository a control parameter, wherein:
       the control parameter is one of the plurality of control parameters
       the control parameter provides information about delivery and/or caching of the content object;
     insert a string into a uniform resource identifier (URI) or a response header of a response for the content object, wherein the string identifies the control parameter;
     transmit the response for the content object, wherein:
       the response to the request is routed through a terminal network; and
       the terminal network is operated by a different entity than an entity that operates the content delivery network;
   the terminal network configured to:
     receive the response to the request;
     identify the string contained in the URI or header of the response;
     identify the control parameter; and
     process a delivery or a storage of the content object based on the control parameter.

2. The system for controlling delivery of the content object over the Internet using the cooperative delivery system as recited in claim 1, wherein the string is identifiable for removal before forwarding to the end-user system, and the terminal network removes the string before forwarding the response for the content object to the end-user system.

3. The system for controlling delivery of the content object over the Internet using the cooperative delivery system as recited in claim 1, further comprising requesting the terminal network to purge the content object from a cache in the terminal network, wherein the terminal network purges the content object from the cache in the terminal network.

4. The system for controlling delivery of the content object over the Internet using the cooperative delivery system as recited in claim 1, wherein the control parameter specifies a minimum or maximum bandwidth for delivering the content object.

5. The system for controlling delivery of the content object over the Internet using the cooperative delivery system as recited in claim 1, wherein the control parameter specifies a start and/or stop time for delivering the content object.

6. The system for controlling delivery of the content object over the Internet using the cooperative delivery system as recited in claim 1, wherein the rules repository is part of the content delivery network.

7. A method for controlling delivery of a content object over the Internet using a cooperative delivery system, the method comprising:
   receiving a request for the content object from an end-user system at a content delivery network;
   querying a rules repository for a control parameter, wherein:
     the rules repository comprises a plurality of control parameters;
     the plurality of control parameters relate to delivery or caching of content objects;
     the control parameter is one of the plurality of control parameters; and
     the control parameter provides information about delivery and/or caching of the content object;
   receiving the control parameter relating to the delivery and/or caching of the content object;
   inserting a string into a uniform resource identifier (URI) or a response header of a response for the content object that identifies the control parameter;
   transmitting the response for the content object, wherein:
     the response to the request is routed through a terminal network;
     the terminal network is operated by a different entity than an entity that operates the content delivery network;
     the terminal network receives the response to the request;
     the terminal network identifies the string contained in the URI of the response;
     the terminal network identifies the control parameter; and
     the terminal network processes a delivery or a storage of the content object based on the control parameter.

8. The method for controlling delivery of the content object over the Internet using a cooperative delivery system as recited in claim 7, transmitting the response for the content object further includes the terminal network forwarding the response for the content object to the end-user system.

9. The method for controlling delivery of the content object over the Internet using a cooperative delivery system as recited in claim 8, wherein the string is identifiable for removal before forwarding to the end-user system, and the terminal network removes the string before forwarding the response for the content object to the end-user system.

10. The method for controlling delivery of the content object over the Internet using a cooperative delivery system as recited in claim 7, further comprising requesting the terminal network to purge the content object from a cache in the terminal network, wherein the terminal network purges the content object from the cache in the terminal network.

11. The method for controlling delivery of the content object over the Internet using a cooperative delivery system as recited in claim 7, wherein:
- a non-zero time-to-live value for the content object is in an HTTP header of the response;
- the control parameter specifies the content object should not be cached; and
- the terminal network does not cache the content object according to the control parameter.

12. The method for controlling delivery of the content object over the Internet using a cooperative delivery system as recited in claim 7, further comprising assigning a time-to-live value in a header of the response, and wherein:
- the control parameter specifies the content object should be cached for a longer duration than the time-to-live value in the header of the response; and
- the terminal network caches the content object according to the control parameter instead of the time-to-live value in the header.

13. A method for controlling delivery of a content object over the Internet using a cooperative delivery system, the method comprising:
- receiving a request for the content object from an end-user system at a content delivery network;
- querying a rules repository for a control parameter, wherein:
  - the rules repository comprises a plurality of control parameters;
  - the plurality of control parameters relate to delivery or caching of content objects;
  - the control parameter is one of the plurality of control parameters; and
  - the control parameter provides information about delivery and/or caching of the content object;
- receiving the control parameter relating to the delivery and/or caching of the content object;
- transmitting an out-of-band signal to a terminal network, wherein:
  - the out-of-band signal identifies the control parameter;
- transmitting a response for the content object, wherein:
  - the response to the request is routed through the terminal network;
  - the terminal network is operated by a different entity than an entity that operates the content delivery network;
  - the terminal network receives the response to the request; and
  - the terminal network processes a delivery or a storage of the content object based on the control parameter.

14. The method for controlling delivery of the content object over the Internet using a cooperative delivery system as recited in claim 13, further comprising requesting the terminal network to purge the content object from a cache in the terminal network, wherein the terminal network purges the content object from the cache in the terminal network.

15. The method for controlling delivery of the content object over the Internet using a cooperative delivery system as recited in claim 13, wherein:
- the control parameter comprise metrics for how popular the content object is; and
- the terminal network determines whether or not, or how long, to cache the content object based on the metrics for how popular the content object is.

16. The method for controlling delivery of the content object over the Internet using a cooperative delivery system as recited in claim 13, wherein the control parameter identifies the content delivery network.

17. The method for controlling delivery of the content object over the Internet using a cooperative delivery system as recited in claim 13, further comprising requesting the terminal network to purge the content object from a cache in the terminal network, wherein the terminal network purges the content object from the cache in the terminal network.

18. The method for controlling delivery of the content object over the Internet using a cooperative delivery system as recited in claim 13, wherein the control parameter specifies a time of day that the content object is permitted to be delivered.

19. The method for controlling delivery of the content object over the Internet using a cooperative delivery system as recited in claim 13, wherein the control parameter specifies a minimum quality of service for delivering the content object.

20. The method for controlling delivery of the content object over the Internet using a cooperative delivery system as recited in claim 13, wherein the control parameter specifies a minimum or maximum bandwidth for delivering the content object.

* * * * *